United States Patent
Garudadri et al.

(10) Patent No.: US 10,034,198 B2
(45) Date of Patent: Jul. 24, 2018

(54) DELIVERY OF INFORMATION OVER A COMMUNICATION CHANNEL

(71) Applicant: QUALCOMM Incorporated, San Diego, CA (US)

(72) Inventors: Harinath Garudadri, San Diego, CA (US); Phoom Sagetong, San Diego, CA (US); Sanjiv Nanda, Ramona, CA (US); Stein Arne Lundby, Solana Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 610 days.

(21) Appl. No.: 14/499,954

(22) Filed: Sep. 29, 2014

(65) Prior Publication Data
US 2015/0016427 A1    Jan. 15, 2015

Related U.S. Application Data

(62) Division of application No. 11/129,625, filed on May 13, 2005, now abandoned.
(Continued)

(51) Int. Cl.
*H04W 28/06* (2009.01)
*H04L 29/06* (2006.01)
(Continued)

(52) U.S. Cl.
CPC ............ *H04W 28/06* (2013.01); *H04L 29/06* (2013.01); *H04L 29/06027* (2013.01);
(Continued)

(58) Field of Classification Search
None
See application file for complete search history.

(56) References Cited

U.S. PATENT DOCUMENTS

| 4,948,019 A | 8/1990 | Rodum |
| 5,510,842 A | 4/1996 | Phillips et al. |

(Continued)

FOREIGN PATENT DOCUMENTS

| CN | 1316163 A | 10/2001 |
| EP | 0424903 | 5/1991 |

(Continued)

OTHER PUBLICATIONS

3GPP TS 45.002 , V6.9.0 (Apr. 2005); 3rd Generation Partnership Project; Technical Specification Group GSM/EDGE Radio Access Network; Multiplexing and multiple access on the radio path (Release 6).

(Continued)

*Primary Examiner* — Anh Ngoc Nguyen
(74) *Attorney, Agent, or Firm* — Muncy, Geissler, Olds & Lowe, P.C.

(57) ABSTRACT

Methods and apparatus are described for transmitting information units over a plurality of constant bit rate communication channel. The techniques include encoding the information units, thereby creating a plurality of data packets. The encoding is constrained such that the data packet sizes match physical layer packet sizes of the communication channel. The information units may include a variable bit rate data stream, multimedia data, video data, and audio data. The communication channels include CMDA channels, WCDMA, GSM channels, GPRS channels, and EDGE channels.

50 Claims, 22 Drawing Sheets

Related U.S. Application Data

(60) Provisional application No. 60/571,673, filed on May 13, 2004.

(51) Int. Cl.
| | | |
|---|---|---|
| *H04L 12/805* | (2013.01) | |
| *H04N 21/2381* | (2011.01) | |
| *H04N 21/414* | (2011.01) | |
| *H04N 21/61* | (2011.01) | |
| *H04N 21/6437* | (2011.01) | |
| *H04N 21/647* | (2011.01) | |
| *H04W 88/18* | (2009.01) | |
| *H04N 19/102* | (2014.01) | |
| *H04N 19/115* | (2014.01) | |
| *H04N 19/61* | (2014.01) | |
| *H04N 19/124* | (2014.01) | |
| *H04N 19/152* | (2014.01) | |
| *H04N 19/164* | (2014.01) | |
| *H04N 19/174* | (2014.01) | |
| *H04W 4/06* | (2009.01) | |
| *H04W 72/04* | (2009.01) | |
| *H04W 88/02* | (2009.01) | |
| *H04N 21/44* | (2011.01) | |
| *H04N 21/4788* | (2011.01) | |
| *H04W 72/12* | (2009.01) | |
| *H04W 80/00* | (2009.01) | |
| *H04W 84/04* | (2009.01) | |

(52) U.S. Cl.
CPC ............ *H04L 47/36* (2013.01); *H04L 65/601* (2013.01); *H04L 65/604* (2013.01); *H04L 65/80* (2013.01); *H04L 69/04* (2013.01); *H04L 69/161* (2013.01); *H04L 69/166* (2013.01); *H04N 19/102* (2014.11); *H04N 19/115* (2014.11); *H04N 19/124* (2014.11); *H04N 19/152* (2014.11); *H04N 19/164* (2014.11); *H04N 19/174* (2014.11); *H04N 19/61* (2014.11); *H04N 21/2381* (2013.01); *H04N 21/41407* (2013.01); *H04N 21/6131* (2013.01); *H04N 21/6181* (2013.01); *H04N 21/6437* (2013.01); *H04N 21/64707* (2013.01); *H04W 4/06* (2013.01); *H04W 28/065* (2013.01); *H04W 72/044* (2013.01); *H04W 88/02* (2013.01); *H04W 88/181* (2013.01); *H04L 69/22* (2013.01); *H04N 21/44004* (2013.01); *H04N 21/4788* (2013.01); *H04W 72/1263* (2013.01); *H04W 80/00* (2013.01); *H04W 84/04* (2013.01)

(56) References Cited

U.S. PATENT DOCUMENTS

| | | | |
|---|---|---|---|
| 5,537,409 A | 7/1996 | Moriyama et al. | |
| 5,541,852 A | 7/1996 | Eyuboglu et al. | |
| 5,557,332 A | 9/1996 | Koyanagi et al. | |
| 5,559,608 A | 9/1996 | Kunihiro | |
| 5,570,372 A | 10/1996 | Shaffer | |
| 5,572,705 A | 11/1996 | Carson | |
| 5,583,652 A | 12/1996 | Ware | |
| 5,646,693 A | 7/1997 | Cismas | |
| 5,717,464 A | 2/1998 | Perkins et al. | |
| 5,729,534 A * | 3/1998 | Jokinen ............... H04B 7/2656 370/280 |
| 5,844,600 A | 12/1998 | Kerr | |
| 5,867,230 A | 2/1999 | Wang et al. | |
| 5,898,695 A | 4/1999 | Fujii et al. | |
| 5,914,717 A | 6/1999 | Kleewein et al. | |
| 6,023,552 A | 2/2000 | Kunihiro | |
| 6,041,067 A | 3/2000 | Takamori et al. | |
| 6,058,141 A | 5/2000 | Barger et al. | |
| 6,085,270 A | 7/2000 | Gulick | |
| 6,108,626 A | 8/2000 | Cellario et al. | |
| 6,111,916 A | 8/2000 | Talluri et al. | |
| 6,154,780 A | 11/2000 | Zhu | |
| 6,181,711 B1 | 1/2001 | Zhang et al. | |
| 6,192,257 B1 | 2/2001 | Ray | |
| 6,215,789 B1 * | 4/2001 | Keenan ............... H04L 12/413 370/395.53 |
| 6,262,829 B1 | 7/2001 | Kuramoto et al. | |
| 6,473,404 B1 | 10/2002 | Kaplan et al. | |
| 6,473,442 B1 | 10/2002 | Lundsjo et al. | |
| 6,496,504 B1 | 12/2002 | Malik | |
| 6,529,527 B1 | 3/2003 | Chen et al. | |
| 6,535,043 B2 | 3/2003 | Chen | |
| 6,535,557 B1 | 3/2003 | Saito et al. | |
| 6,536,043 B1 | 3/2003 | Guedalia | |
| 6,542,481 B2 | 4/2003 | Foore et al. | |
| 6,564,382 B2 | 5/2003 | Duquesnois et al. | |
| 6,584,125 B1 | 6/2003 | Katto | |
| 6,584,200 B1 | 6/2003 | Tanaka | |
| 6,647,006 B1 * | 11/2003 | Rasanen ............ H04W 88/181 370/345 |
| 6,680,955 B1 | 1/2004 | Le | |
| 6,704,281 B1 | 3/2004 | Hourunranta et al. | |
| 6,747,964 B1 | 6/2004 | Bender | |
| 6,891,854 B2 | 5/2005 | Zhang et al. | |
| 6,920,118 B2 | 7/2005 | Lozano | |
| 6,956,875 B2 | 10/2005 | Kapadia et al. | |
| 6,968,091 B2 | 11/2005 | Faibish et al. | |
| 6,996,069 B2 | 2/2006 | Willenegger | |
| 7,016,337 B1 | 3/2006 | Wu et al. | |
| 7,043,749 B1 | 5/2006 | Davies | |
| 7,068,708 B2 | 6/2006 | LaRosa et al. | |
| 7,149,549 B1 | 12/2006 | Ortiz et al. | |
| 7,230,941 B2 | 6/2007 | Odenwalder et al. | |
| 7,370,094 B2 | 5/2008 | Rousseau et al. | |
| 7,391,717 B2 | 6/2008 | Klemets et al. | |
| 7,453,843 B2 | 11/2008 | Mowery et al. | |
| 7,486,678 B1 | 2/2009 | Devanagondi et al. | |
| 7,530,089 B1 | 5/2009 | Hayes et al. | |
| 7,680,912 B1 | 3/2010 | McNabb et al. | |
| 8,089,948 B2 | 1/2012 | Garudadri et al. | |
| 8,855,059 B2 | 10/2014 | Garudadri et al. | |
| 2001/0008535 A1 | 7/2001 | Lanigan | |
| 2001/0017853 A1 | 8/2001 | Kikuchi et al. | |
| 2001/0021197 A1 * | 9/2001 | Foore ................... H04J 3/1682 370/468 |
| 2002/0009287 A1 | 1/2002 | Ueda | |
| 2002/0048321 A1 | 4/2002 | Katayama | |
| 2002/0093982 A1 | 7/2002 | Joy et al. | |
| 2002/0105976 A1 | 8/2002 | Kelly et al. | |
| 2002/0114388 A1 | 8/2002 | Ueda et al. | |
| 2002/0131426 A1 | 9/2002 | Amit et al. | |
| 2002/0137521 A1 * | 9/2002 | Kim ................... H04W 72/1226 455/453 |
| 2002/0150123 A1 | 10/2002 | Ro | |
| 2002/0194606 A1 | 12/2002 | Tucker et al. | |
| 2003/0016702 A1 | 1/2003 | Bender et al. | |
| 2003/0021298 A1 | 1/2003 | Murakami et al. | |
| 2003/0026342 A1 | 2/2003 | Horiike et al. | |
| 2003/0039465 A1 | 2/2003 | Bjorgan et al. | |
| 2003/0053484 A1 | 3/2003 | Sorenson et al. | |
| 2003/0063628 A1 | 4/2003 | Marko et al. | |
| 2003/0086373 A1 | 5/2003 | Kronz | |
| 2003/0128882 A1 | 7/2003 | Kim et al. | |
| 2003/0140347 A1 | 7/2003 | Varsa | |
| 2003/0152107 A1 | 8/2003 | Pekonen | |
| 2003/0152224 A1 | 8/2003 | Candelore et al. | |
| 2003/0161401 A1 | 8/2003 | Shen et al. | |
| 2003/0224806 A1 | 12/2003 | Hebron | |
| 2004/0008766 A1 | 1/2004 | Wang et al. | |
| 2004/0052209 A1 | 3/2004 | Ortiz | |
| 2004/0057446 A1 | 3/2004 | Varsa et al. | |
| 2004/0066319 A1 | 4/2004 | Chang et al. | |
| 2004/0078744 A1 | 4/2004 | Wei et al. | |

(56) References Cited

U.S. PATENT DOCUMENTS

| | | |
|---|---|---|
| 2004/0174912 A1 | 9/2004 | Moon |
| 2004/0196870 A1 | 10/2004 | Cheng et al. |
| 2004/0198371 A1 | 10/2004 | Balasubramanian et al. |
| 2005/0047417 A1 | 3/2005 | Lee et al. |
| 2005/0094655 A1 | 5/2005 | Newson et al. |
| 2005/0105615 A1 | 5/2005 | El-Maleh et al. |
| 2005/0138251 A1 | 6/2005 | Fanning |
| 2005/0169374 A1 | 8/2005 | Marpe et al. |
| 2005/0172154 A1 | 8/2005 | Short et al. |
| 2005/0220071 A1 | 10/2005 | Sivalingham et al. |
| 2005/0226262 A1 | 10/2005 | Hsieh et al. |
| 2005/0259623 A1 | 11/2005 | Garudadri et al. |
| 2005/0259694 A1 | 11/2005 | Garudadri et al. |
| 2006/0285654 A1 | 12/2006 | Nesvadba et al. |
| 2007/0064588 A1 | 3/2007 | Kisoda et al. |
| 2007/0092224 A1 | 4/2007 | Tsukagoshi et al. |
| 2008/0002669 A1 | 1/2008 | OBrien et al. |
| 2014/0362740 A1 | 12/2014 | Garudadri et al. |

FOREIGN PATENT DOCUMENTS

| | | |
|---|---|---|
| EP | 1564992 | 8/2005 |
| JP | 2000196634 | 7/2000 |
| JP | 2004226272 | 8/2004 |
| KR | 1997012585 | 3/1997 |
| KR | 20010024530 | 3/2001 |
| KR | 20010024531 | 3/2001 |
| KR | 20020044169 | 6/2002 |
| WO | WO-9528684 | 10/1995 |
| WO | WO-0021321 A1 | 4/2000 |
| WO | WO-0078054 A1 | 12/2000 |
| WO | WO-0152553 A1 | 7/2001 |
| WO | WO-0152565 A2 | 7/2001 |
| WO | WO-0205575 | 1/2002 |
| WO | WO-0215591 A1 | 2/2002 |
| WO | WO-0223745 | 3/2002 |
| WO | WO-0223916 A1 | 3/2002 |
| WO | 02065667 | 8/2002 |
| WO | WO-02080600 A1 | 10/2002 |
| WO | 02089434 | 11/2002 |
| WO | WO-03041326 A2 | 5/2003 |
| WO | WO-2004036816 | 4/2004 |

OTHER PUBLICATIONS

Borman C, et al., "Robust Header Compression: Framework and four profiles: RTP, UDP, ESP and uncompressed; rfc3095.txt" IETF Standard, Internet Engineering Task Force, IETF, CH Jul. 2001 XP015008878.

European Search Report—EP10152927—Search Authority—The Hague—dated Sep. 13, 2012.

European Search Report—EP10182418 ,Search Authority—The Hague Patent Office, dated Nov. 4, 2010.

Eyuboglu M, "Device, Method and System for variable Bit-Rate Packet Video Communications", WO 9528684.

Formulasys, The Basics of Wireless, p. 3-16, 2002.

Formulasys, "The Basics of Wireless",Dec. 21, 2003, Formulasys.com, all pages.

Garudadri et al "Video Transport over Wireless Networks", 2004,ACM,all pages.

International Search Report—PCT/US05/016837, International Search Authority—European Patent Office—dated Nov. 28, 2005.

Jonsson: "Zero Byte ROHC RTP", Ericsson Research, Lulea Sweden, Mar. 23, 2001.

Kikuchi, et al., "RTP Payload Format for MPEG-4 Audio/Visual Streams," Network Working Group, RFC 3016, Nov. 2000, 20 pp.

Kunhiro H, "Data Recording System using CD-ROM has frame constituting . . . ", EP 424903 A.

Pyun, J.Y., et al., "Wireless Measurement Based Resource Allocation for QoS Provisioning over IEEE 802.11 Wireless LAN", IEEE Trans. on Consumer Electronics, Aug. 2003, vol. 49, No. 3, pp. 614-620.

Schulzrinne, et al.,"RTP: A Transport Protocol for Real-Time Applications," IETF RFC 3550 (Jul. 2003).

Svanbro: "Lower Layer Guidelines for Robust RTP UDP IP Header Compression", IETF Standard, Internet Engineering Task Force, IETF, CH,Networking Working Group, 3409 Ericsson, Dec. 2002, XP015009203.

Written Opinion—PCT/US05/016837, International Search Authority—European Patent Office—dated Nov. 28, 2005.

Yallapragada R., et al., "Video Delivery Over Cellular Wireless Networks using EBR Techniques", Personal Wireless Communications, 2005. ICPWC 2005. 2005 IEEE International Conference on New Delhi, India Jan. 23-25, 2005, Piscataway, NJ, USA, IEEE, Jan. 23, 2005 (Jan. 23, 2005), pp. 249-253, XP010798556.

* cited by examiner

DELIVERY OF INFORMATION OVER A COMMUNICATION CHANNEL

CLAIM OF PRIORITY UNDER 35 U.S.C §119

The present application for patent is a Divisional Application of U.S. Utility application Ser. No. 11/129,625, entitled "Apparatus and Method for Decoding Information Received over a Communication Channel", filed May 13, 2005, which claims priority to U.S. Provisional Application No. 60/571,673, entitled "Multimedia Packets Carried by CDMA Physical Layer Products", filed May 13, 2004, and assigned to the assignee hereof and hereby expressly incorporated by reference herein

REFERENCE TO CO-PENDING APPLICATIONS FOR PATENT

The present application for patent is related to the following co-pending U.S. patent applications:

"Method And Apparatus For Allocation Of Information To Channels Of A Communication System", having Ser. No. 11/129,687, filed concurrently herewith, assigned to the assignee hereof, and expressly incorporated in its entirety by reference herein; and "Header Compression Of Multimedia Data Transmitted Over A Wireless Communication System", having Ser. No. 11/129,735, filed concurrently herewith, assigned to the assignee hereof, and expressly incorporated in it entirety by reference herein; and "Synchronization Of Audio And Video Data In A Wireless Communication System", having Ser. No. 11/129,635, filed concurrently herewith, assigned to the assignee hereof, and expressly incorporated in its entirety by reference herein.

BACKGROUND

I. Field

The present invention relates generally to delivery of information over a communication system, and more specifically, to partitioning of information units to match a physical layer packet of a constant bit rate communication link.

II. Background

Demand for the delivery of multimedia data over various communication networks is increasing. For example, consumers desire the delivery of video over various communication channels, such as the Internet, wire-line and radio networks. Multimedia data can be different formats and data rates, and the various communication networks use different mechanisms for transmission of real time data over their respective communication channels.

One type of communication network that has become commonplace is mobile radio networks for wireless communications. Wireless communication systems have many applications including, for example, cellular telephones, paging, wireless local loops, personal digital assistants (PDAs), Internet telephony, and satellite communication systems. A particularly important application is cellular telephone systems for mobile subscribers. As used herein, the term "cellular" system encompasses both cellular and personal communications services (PCS) frequencies. Various over-the-air interfaces have been developed for such cellular telephone systems including frequency division multiple access (FDMA), time division multiple access (TDMA), and code division multiple access (CDMA).

Different domestic and international standards have been established to support the various air interfaces including, for example, Advanced Mobile Phone Service (AMPS), Global System for Mobile (GSM), General Packet Radio Service (GPRS), Enhanced Data GSM Environment (EDGE), Interim Standard 95 (IS-95) and its derivatives, IS-95A, IS-95B, ANSI J-STD-008 (often referred to collectively herein as IS-95), and emerging high-data-rate systems such as cdma2000, Universal Mobile Telecommunications Service (UMTS), and wideband CDMA (WCDMA). These standards are promulgated by the Telecommunication Industry Association (TIA), 3rd Generation partnership Project (3GPP), European Telecommunication Standards Institute (ETSI), and other well-known standards bodies.

Users, or customers, of mobile radio networks, such as cellular telephone networks, would like to receive streaming media such as video, multimedia, and Internet Protocol (IP) over a wireless communication link. For example, customers desire to be able to receive video, such as a teleconference or television broadcasts, on their cell phone or other portable wireless communication device. Other examples of the type of data that customers desire to receive with their wireless communication device include multimedia multicast/broadcast and Internet access.

There are different types of sources of multimedia data and different types of communication channels on which it is desired to transmit the streaming data. For example, a multimedia data source can produce data at a constant bit rate (CBR) or a variable bit rate (VBR). In addition, the communication channel can transmit data at a CBR or a VBR. Table 1 below list various combinations of data sources and communication channels.

TABLE 1

| Source | Channel | Example |
| --- | --- | --- |
| CBR | CBR | mu-law, or A-law on PSTN |
| VBR | VBR | MPEG-4 video over wire-line IP network, cdma2000 variable rate vocoders such as 13K vocoder, EVRC and SMV over fundamental channel (FCH) |
| CBR | VBR | AMR streaming on cdma2000 FCH |
| VBR | CBR | Compressed video over circuit switched Wireless networks (3G-324M) |

Communication channels typically transmit data in chunks, which we refer to as physical layer packets or physical layer frames. The data generated by the multimedia source may be a continuous stream of bytes, such as a voice signal encoded using the mu-law or A-law. More frequently, the data generated by the multimedia source consists in groups of bytes, called data packets. For example, an MPEG-4 video encoder compresses visual information as a sequence of information units, which we refer herein as video frames. Visual information is typically encoded at a constant video frame rate by the encoder, of typically 25 or 30 Hz, and must be rendered at the same rate by the decoder. The video frame period is the time between two video frames and can be computed as the inverse of the video frame rate, for example the video frame period of 40 ms corresponds to a video frame rate of 25 Hz. Each video frame is encoded into a variable number of data packets, and all the data packets are transmitted to the decoder. If a portion of a data packet is lost, that packet becomes unusable by the decoder. On the other hand, the decoder may reconstitute the video frame even if some of the data packets are lost, but at the cost of some quality degradation in the resulting video sequence. Each data packet therefore contains part of the description of the video frame, and the number packets are therefore variable from one video frame to another.

In the case when a source produces data at a constant bit rate and a communication channel transmits data at a constant rate, the communication system resources are efficiently utilized, assuming that the communication channel data rate is at least as fast as the source data rate, or if the two data rates are otherwise matched. In other words, if the constant data rate of the source is the same as the constant data rate of the channel, then the resources of the channel can be fully utilized, and the source data can be transmitted with no delay. Likewise, if the source produces data at a variable rate and the channel transmits at a variable rate, then as long as the channel data rate can support the source data rate, then the two data rates can be matched and, again, the resources of the channel are fully utilized and all of the source data can be transmitted with no delay.

If the source produces data at a constant data rate and the channel is a variable data rate channel, then the channel resources may not be as efficiently utilized as possible. For example, in this mismatched case the statistical multiplexing gain (SMG) is less than that compared with a CBR source on a matched CBR channel. Statistical multiplexing gain results when the same communication channel can be used, or multiplexed, between multiple users. For example, when a communication channel is used to transmit voice, the speaker does not usually talk continuously. That is, there will be a "talk" spurt from the speaker followed by silence (listening). If the ratio of time for the "talk" spurt to the silence was, for example 1:1, then on average the same communication channel could be multiplexed and could support two users. But in the case where the data source has a constant data rate and is delivered over a variable rate channel, there is no SMG because there is no time when the communication channel can be used by another user. That is, there is no break during "silence" for a CBR source.

The last case noted in Table 1 above, is the situation when the source of multimedia data is a variable bit rate stream, such as a multimedia data stream like video, and it is transmitted over a communication channel that has a constant bit rate, such as a wireless radio channel with a constant bit rate assignment. In this case, delay is typically introduced between the source and the communication channel, creating "spurts" of data so that the communication channel can be efficiently utilized. In other words, the variable rate data stream is stored in a buffer and delayed long enough so that the output of the buffer can be emptied at a constant data rate, to match the channel fixed data rate. The buffer needs to store, or delay, enough data so that it is able to maintain a constant output without "emptying" the buffer so the CBR communication channel is fully utilized and the communication channel's resources are not wasted.

The encoder periodically generates video frames according to the video frame period. Video frames consist of data packets, and the total amount of data in a video frame is variable. The video decoder must render the video frames at the same video frame rate used by the encoder in order to ensure an acceptable result for the viewer. The transmission of video frames, which have a variable amount of data, at a constant video frame rate and over a constant rate communication channel can result in inefficiency. For example, if the total amount of data in a video frame is too large to be transmitted within the video frame period at the bit rate of the channel, then the decoder may not receive the entire frame in time to render it according to the video frame rate. In practice, a traffic shaping buffer is used to smooth such large variations for delivery over a constant rate channel. This introduces a delay in rendering the video, if a constant video frame rate is to be maintained by the decoder.

Another problem is that if data from multiple video frames is contained in a single physical layer packet, then the loss of a single physical layer packet results in degradation of multiple video frames. Even for the situations when the data packets are close to the physical layer packet sizes, the loss of one physical layer packet can result in the degradation of multiple video frames.

There is therefore a need in the art for techniques and apparatus that can improve the transmission of variable data rate multimedia data over constant data rate channels.

SUMMARY

Embodiments disclosed herein address the above stated needs by providing methods and apparatus for transmitting information units over a constant bit rate communication channel. The techniques include partitioning the information units into data packets wherein the size of the data packets are selected to match physical layer data packet sizes of a communication channel. For example, the number of bytes contained in each information unit may vary over time and the number of bytes that each physical layer data packets that communication channels can carry may vary independently. The techniques describe partition the information units, thereby creating a plurality of data packets. For example, an encoder may be constrained such that it encodes the information units into data packets of sizes that do not exceed, or "match", the physical layer packet sizes of the communication channel. The data packets are then assigned to the physical layer data packets of the communication channel.

The phrase "multimedia frame", for video, is used herein to mean a video frame that can be displayed/rendered on a display device, after decoding. A video frame can be further divided in to independently decodable units. In video parlance, these are called "slices." In the case of audio and speech, the term "multimedia frame" is used herein to mean information in a time window over which speech or audio is compressed for transport and decoding at the receiver. The phrase "information unit interval" is used herein to represent the time duration of the multimedia frame described above. For example, in case of video, information unit interval is 100 milliseconds in the case of 10 frames per second video. Further, as an example, in the case of speech, the information unit interval is typically 20 milliseconds in cdma2000, GSM and WCDMA. From this description, it should be evident that, typically audio/speech frames are not further divided in to independently decodable units and typically video frames are further divided in to slices that are independently decodable. It should be evident form the context when the phrases "multimedia frame", "information unit interval", etc. refer to multimedia data of video, audio and speech.

The techniques can be used with various over-the-air interfaces, such as, Global System for Mobile Communication (GSM), General Packet Radio Service (GPRS), Enhanced Data GSM Environment (EDGE), or standards based on CDMA such as TIA/EIA-95-B (IS-95), TIA/EIA-98-C (IS-98), IS-2000, HRPD, Wideband CDMA (WCDMA), and others.

Aspects include determining possible physical layer packet sizes of at least one available constant bit rate communication channel. Information units are partitioned, thereby creating a plurality of data packets such that the size of an individual data packet does not exceed, or is matched to, one of the physical layer packets of at least one of the constant bit rate communication channels. The data packets are then encoded and assigned to the physical layer packets of the matched constant bit rate communication channel. Encoding information can include a source encoder equipped with a rate controlled module capable of generating partitions of varying size.

Using the techniques described, information units are encoded into a stream of data packets that are transmitted over one or more constant bit rate channels. As the information units vary in size, they may be encoded into different sized data packets, and different combinations of constant bit rate channels, with different available physical layer packet sizes, may be used to transmit the data packets. For example, an information unit may include video data that is included in video frames of different sizes, and thus different combinations of fixed bit rate communication channel physical layer packets may be selected to accommodate the transmission of the different sized video frames.

Other aspects include determining a physical layer packet size and an available data rate of a plurality of constant bit rate communication channels. Then, information units are assigned to data packets, wherein individual data packet sizes are selected to be a size that fits into a physical layer packet of one of the individual constant bit rate communication channels. A combination of individual constant bit rate channels may be selected such that the physical layer packet sizes match the variable bit rate data stream packet sizes. Different combinations of constant bit rate channels, for example one or more, may be selected depending on the variable bit rate data stream.

Another aspect is an encoder configured to accept information units. The information units are then partitioned into data packets wherein the size of individual data packets do not exceed, or are matched to, a physical layer packet size of one of an available constant bit rate communication channel.

Another aspect is a decoder configured to accept data streams from a plurality of constant bit rate communication channels. The data streams are decoded and the decoded data streams are accumulated into a variable bit rate data stream.

Examples of constant bit rate communication channels include GSM, GPRS, EDGE, or standards based on CDMA such as TIA/EIA-95-B (IS-95), TIA/EIA-98-C (IS-98), IS-2000, HRPD, and Wideband CDMA (WCDMA).

Other features and advantages of the present invention should be apparent from the following description of exemplary embodiments, which illustrate, by way of example, aspects of the invention.

DETAILED DESCRIPTION

Figure 1:
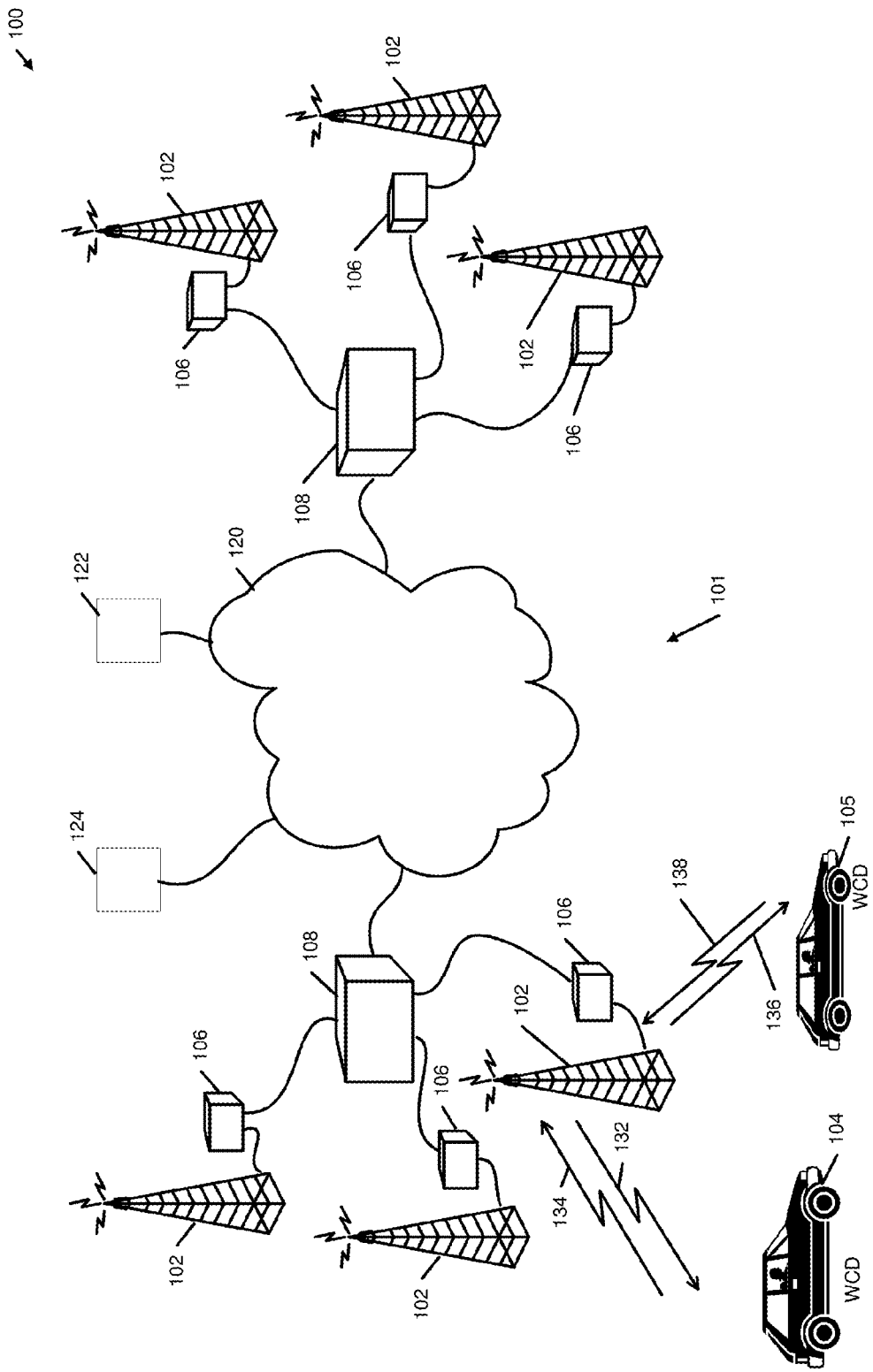
FIG. 1 is an illustration of portions of a communication system 100 constructed in accordance with the present invention.

The word "exemplary" is used herein to mean "serving as an example, instance, or illustration." Any embodiment described herein as "exemplary" is not necessarily to be construed as preferred or advantageous over other embodiments.

The word "streaming" is used herein to mean real time delivery of multimedia data of continuous in nature, such as, audio, speech or video information, over dedicated and shared channels in conversational, unicast and broadcast applications. The phrase "multimedia frame", for video, is used herein to mean video frame that can be displayed/rendered on a display device, after decoding. A video frame can be further divided in to independently decodable units. In video parlance, these are called "slices". In the case of audio and speech, the term "multimedia frame" is used herein to mean information in a time window over which speech or audio is compressed for transport and decoding at the receiver. The phrase "information unit interval" is used herein to represent the time duration of the multimedia frame described above. For example, in case of video, information unit interval is 100 milliseconds in the case of 10 frames per second video. Further, as an example, in the case of speech, the information unit interval is typically 20 milliseconds in cdma2000, GSM and WCDMA. From this description, it should be evident that, typically audio/speech frames are not further divided in to independently decodable units and typically video frames are further divided in to slices that are independently decodable. It should be evident form the context when the phrases "multimedia frame", "information unit interval", etc. refer to multimedia data of video, audio and speech.

Techniques for transmitting information units over a plurality of constant bit rate communication channel are described. The techniques include partitioning the information units into data packets wherein the size of the data packets are selected to match physical layer data packet sizes of a communication channel. For example, the information units may occur at a constant rate and the communication channels may transmit physical layer data packets at a different rate. The techniques describe partitioning the information units, thereby creating a plurality of data packets. For example, an encoder may be constrained such that it encodes the information units into sizes that match physical layer packet sizes of the communication channel. The encoded data packets are then assigned to the physical layer data packets of the communication channel. The information units may include a variable bit rate data stream, multimedia data, video data, and audio data. The communication channels include GSM, GPRS, EDGE, or standards based on CDMA such as TIA/EIA-95-B (IS-95), TIA/EIA-98-C (IS-98), IS2000, HRPD, cdma2000, Wideband CDMA (WCDMA), and others.

Aspects include determining possible physical layer packet sizes of at least one available constant bit rate communication channel. Information units are partitioned, thereby creating a plurality of data packets such that the size of an individual data packet is matched to one of the physical layer packets of at least one of the constant bit rate communication channels. The data packets are then encoded and assigned to the physical layer packets of the matched constant bit rate communication channel. In this way, information units are encoded into a stream of data packets that are transmitted over one or more constant bit rate channels. As the information units vary, they may be encoded into different sized data packets, and different combinations of constant bit rate channels, with different available physical layer packet sizes, may be used to transmit the data packets. For example, an information unit may include video data that is included in frames of different sizes, and thus different combinations of fixed bit rate communication channel physical layer packets may be selected to accommodate the transmission of the different sized video frames.

Other aspects include determining a physical layer packet size and an available data rate of a plurality of constant bit rate communication channels. Then, information units are assigned to data packets, wherein individual data packet sizes are selected to be a size that fits into a physical layer packet of one of the individual constant bit rate communication channels. A combination of individual constant bit rate channels may be selected such that the physical layer packet sizes match the variable bit rate data stream packet sizes. Different combinations of constant bit rate channels, for example one or more, may be selected depending on the variable bit rate data stream.

Another aspect is an encoder configured to accept information units. The information units are then partitioned into data packets wherein the size of individual data packets is matched to a physical layer packet size of one of an available constant bit rate communication channel.

Another aspect is a decoder configured to accept data streams from a plurality of constant bit rate communication channels. The data streams are decoded and the decoded data streams are accumulated into a variable bit rate data stream.

Examples of information units include variable bit rate data streams, multimedia data, video data, and audio data. The information units may occur at a constant repetition rate. For example, the information units may be frames of video data. Examples of constant bit rate communication channels include CMDA channels, GSM channels, GPRS channels, and EDGE channels.

Examples of protocols and formats for transmitting information units, such as variable bit rate data, multimedia data, video data, speech data, or audio data, from a content server or source on the wired network to a mobile are also provided. The techniques described are applicable to any type of multimedia applications, such as unicast streaming, conversational and broadcast streaming applications. For example, the techniques can be used to transmit multimedia data, such as video data (such as a content server on wireline streaming to a wireless mobile), as well as other multimedia applications such as broadcast/multicast services, or audio and conversational services such as video telephony between two mobiles, FIG. 1 shows a communication system 100 constructed in accordance with the present invention. The communication system 100 includes infrastructure 101, multiple wireless communication devices (WCD) 104 and 105, and landline communication devices 122 and 124. The WCDs will also be referred to as mobile stations (MS) or mobiles. In general, WCDs may be either mobile or fixed. The landline communication devices 122 and 124 can include, for example, serving nodes, or content servers, that provide various types of multimedia data such as streaming data. In addition, MSs can transmit streaming data, such as multimedia data.

The infrastructure 101 may also include other components, such as base stations 102, base station controllers 106, mobile switching centers 108, a switching network 120, and the like. In one embodiment, the base station 102 is integrated with the base station controller 106, and in other embodiments the base station 102 and the base station controller 106 are separate components. Different types of switching networks 120 may be used to route signals in the communication system 100, for example, IP networks, or the public switched telephone network (PSTN).

The term "forward link" or "downlink" refers to the signal path from the infrastructure 101 to a MS, and the term "reverse link" or "uplink" refers to the signal path from a MS to the infrastructure. As shown in FIG. 1, MSs 104 and 105 receive signals 132 and 136 on the forward link and transmit signals 134 and 138 on the reverse link. In general, signals transmitted from a MS 104 and 105 are intended for reception at another communication device, such as another remote unit, or a landline communication device 122 and 124, and are routed through the IP network or switching network. For example, if the signal 134 transmitted from an initiating WCD 104 is intended to be received by a destination MS 105, the signal is routed through the infrastructure 101 and a signal 136 is transmitted on the forward link to the destination MS 105. Likewise, signals initiated in the infrastructure 101 may be broadcast to a MS 105. For example, a content provider may send multimedia data, such as streaming multimedia data, to a MS 105. Typically, a communication device, such as a MS or a landline communication device, may be both an initiator of and a destination for the signals.

Examples of a MS 104 include cellular telephones, wireless communication enabled personal computers, and personal digital assistants (PDA), and other wireless devices. The communication system 100 may be designed to support one or more wireless standards. For example, the standards may include standards referred to as Global System for Mobile Communication (GSM), General Packet Radio Service (GPRS), Enhanced Data GSM Environment (EDGE), TIA/EIA-95-B (IS-95), TIA/EIA-98-C (IS-98), IS2000, HRPD, cdma2000, Wideband CDMA (WCDMA), and others.

Figure 2:
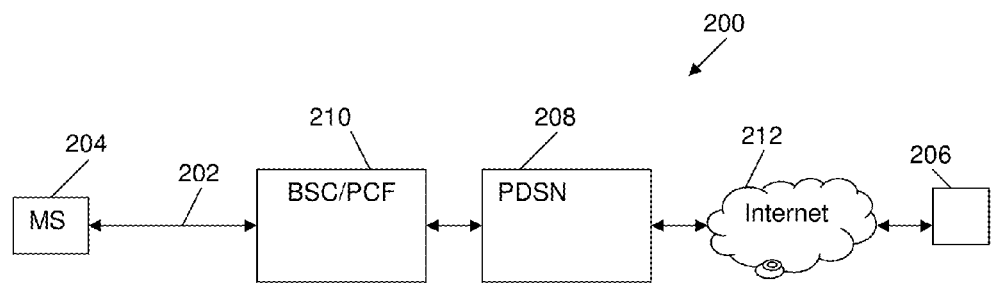
FIG. 2 is a block diagram illustrating an exemplary packet data network and various air interface options for delivering packet data over a wireless network in the FIG. 1 system.

FIG. 2 is a block diagram illustrating an exemplary packet data network and various air interface options for delivering packet data over a wireless network. The techniques described may be implemented in a packet switched data network 200 such as the one illustrated in FIG. 2. As shown in the example of FIG. 2, the packet switched data network system may include a wireless channel 202, a plurality of recipient nodes or MS 204, a sending node or content server 206, a serving node 208, and a controller 210. The sending node 206 may be coupled to the serving node 208 via a network 212 such as the Internet.

The serving node 208 may comprise, for example, a packet data serving node (PDSN) or a Serving GPRS Support Node (SGSN) and a Gateway GPRS Support Node (GGSN). The serving node 208 may receive packet data from the sending node 206, and serve the packets of information to the controller 210. The controller 210 may comprise, for example, a Base Station Controller/Packet Control Function (BSC/PCF) or Radio Network Controller (RNC). In one embodiment, the controller 210 communicates with the serving node 208 over a Radio Access Network (RAN). The controller 210 communicates with the serving node 208 and transmits the packets of information over the wireless channel 202 to at least one of the recipient nodes 204, such as an MS.

In one embodiment, the serving node 208 or the sending node 206, or both, may also include an encoder for encoding a data stream, or a decoder for decoding a data stream, or both. For example the encoder could encode a video stream and thereby produce variable-sized frames of data, and the decoder could receive variable sized frames of data and decode them. Because the frames are of various size, but the video frame rate is constant, a variable bit rate stream of data is produced. Likewise, a MS may include an encoder for encoding a data stream, or a decoder for decoding a received data stream, or both. The term "codec" is used to describe the combination of an encoder and a decoder.

In one example illustrated in FIG. 2, data, such as multimedia data, from the sending node 206 which is connected to the network, or Internet 212 can be sent to a recipient node, or MS 204, via the serving node, or Packet Data Serving Node (PDSN) 206, and a Controller, or Base Station Controller/Packet Control Function (BSC/PCF) 208.

The wireless channel 202 interface between the MS 204 and the BSC/PCF 210 is an air interface and, typically, can use many channels for signaling and bearer, or payload, data.

Air Interface

The air interface 202 may operate in accordance with any of a number of wireless standards. For example, the standards may include standards based on TDMA, such as Global System for Mobile Communication (GSM), General Packet Radio Service (GPRS), Enhanced Data GSM Environment (EDGE), or standards based on CDMA such as TIA/EIA-95-B (IS-95), TIA/EIA-98-C (IS-98), IS2000, HRPD, cdma2000, Wideband CDMA (WCDMA), and others.

In a system based on cdma2000, data can be transmitted on multiple channels, for example, on a fundamental channel (FCH), generally used to transmit voice, a dedicated control channel (DCCH), a supplemental channel (SCH), and a packet data channel (PDCH) as well as other channels.

The FCH provides a communication channel for the transmission of speech at multiple fixed rates, e.g. full rate, half rate, quarter rate and $⅛^{th}$ rate. The FCH provides these rates and when a user's speech activity requires less than the full rate to achieve a target voice quality, the system reduces interference to other users in the system by using one of the lower data rates. The benefit of lowering source rate in order to increase the system capacity is well known in CDMA networks.

DCCH is similar to FCH but provides only full rate traffic at one of two fixed rates, 9.6 kbps in radio configuration three (RC3), and 14.4 in radio configuration five (RC5). This is called 1× traffic rate. SCH can be configured to provide traffic rates at 1×, 2×, 4×, 8× and 16× in cdma2000. When there is no data to be transmitted, both DCCH and SCH can cease transmission, that is not transmit any data, also referred to as dtx, to ensure reduced interference to the other users in the system or to stay within the transmit power budget of the base station transmitter. The PDCH can be configured to transmit data packets that are n*45 bytes, where n={1, 2, 4, 8}.

The FCH and DCCH channels provide a constant delay and low data packet loss for communication of data, for example, to enable conversational services. The SCH and PDCH channels provide multiple fixed bit rate channels providing higher bandwidths, for example, 300 kbps to 3 Mbps, than the FCH and DCCH. The SCH and PDCH also have variable delays because these channels are shared among many users. In the case of SCH, multiple users are multiplexed in time, which introduces different amounts of delay depending on the system load. In the case of PDCH, the bandwidth and delay depend on, for example, the radio conditions, negotiated Quality of Service (QoS), and other scheduling considerations. Similar channels are available in systems based on TIA/EIA-95-B (IS-95), TIA/EIA-98-C (IS-98), IS2000, HRPD, UMTS, and Wideband CDMA (WCDMA).

It is noted that FCH provides multiple fixed bit data rates (full, half, quarter and ⅛) to conserve power required by a voice user. Typically, a voice encoder, or vocoder will use a lower data rate when the time-frequency structure of a signal to be transmitted permits higher compression without unduly compromising the quality. This technique is commonly referred to as source controlled variable bit rate vocoding. Thus, in a system based on TIA/EIA-95-B (IS-95), TIA/EIA-98-C (IS-98), IS2000, HRPD, UMTS, or cdma2000 there are multiple fixed bit rate channels available for transmitting data.

In a system based on CDMA, such as cdma2000, the communication channels are divided into a continuous stream of "slots." For example, the communication channels may be divided into 20 ms segments or time slots. This is also called "Transmit Time Interval" (TTI). Data transmitted during these time slots is assembled into packets, where the size of the data packet depends on the available data rate, or bandwidth, of the channel. Thus, during any individual time slot it is possible that there are individual data packets being transmitted over their respective communication channel. For example, during a single time slot, a data packet may be transmitted on the DCCH channel and a different data packet may simultaneously be transmitted on the SCH channel.

Figure 3:
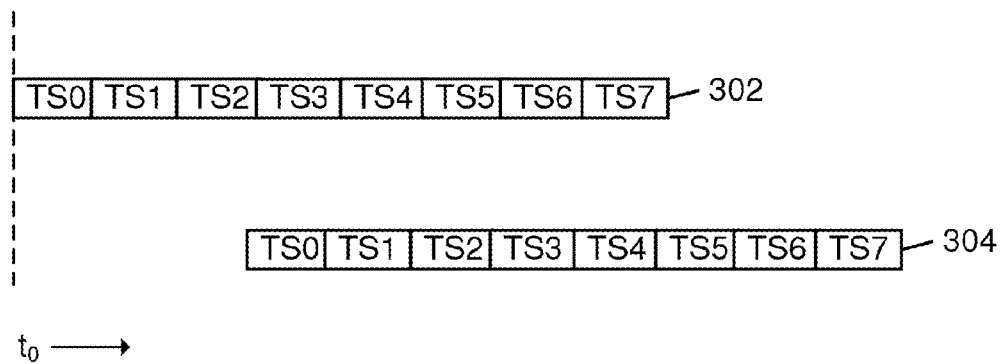
FIG. 3 is a block diagram illustrating two radio frames 302 and 304 in the FIG. 1 system utilizing the GSM air interface.

Likewise, in a system based on GSM, or GPRS, or EDGE, data can be transmitted between the BSC 208 and MS 204 using multiple time slots within a frame. FIG. 3 is a block diagram illustrating two radio frames 302 and 304 in the GSM air interface. As shown in FIG. 3, the GSM air interface radio frames 302 and 304 are each divided into eight timeslots. Individual timeslots are assigned to particular users in the system. In addition, GSM transmission and reception use two different frequencies and forward link and reverse link are offset by three timeslots. For example, in FIG. 3 a downlink radio frame 302 begins at time $t_0$ and would be transmitted at one frequency, and an uplink radio frame 304 would be transmitted at a different frequency. The downlink radio frame 302 is offset by three time slots, TS0-TS2, from the uplink radio frame. Having an offset between the downlink and uplink radio frames allows wireless communication devices, or terminals, to be able to operate without having to be able to transmit and receive at the same time.

Advancements in GSM wireless communication devices, or terminals, have resulted in GSM terminals that can receive multiple timeslots during the same radio frames. These are called "multislot classes" and can be found in Annex B of 3GPP TS 45.002, incorporated herein in its entirety. Thus, in a system based on GSM, or GPRS, or EDGE there are multiple fixed time slots available for transmitting data.

VBR Multimedia Characteristics

Variable Bit Rate (VBR) multimedia data, such as video, usually includes common characteristics. For example, video data is generally captured at a constant frame rate by a sensor, such as a camera. A multimedia transmitter generally requires a finite processing time with an upper bound to encode the video stream. A multimedia receiver generally requires a finite processing time with an upper bound to decode the video stream.

It is generally desirable to reconstruct multimedia frames at the same frame rate at which they were produced. For example, in the case of video it is desirable to display the reconstructed video frames at the same rate at which the video was captured at a sensor or camera. Having the reconstruction and capture rate the same makes it easier to synchronize with other multimedia elements, for example, synchronizing a video stream with an accompanying audio, or speech, steam is simplified.

In the case of video, from a human perception point of view, it is usually desirable to maintain a consistent level of quality. It is generally more annoying, and taxing, for a person to process a continuous multimedia stream with fluctuations in quality than to process a multimedia stream of consistent quality. For example, it is usually annoying to a person to process a video stream that includes quality artifacts such as freeze frames and blockiness.

Delay Considerations

Transporting multimedia content, for example, audio/video typically incurs delays. Some of these delays are due to codec settings and some are due to network settings such as radio-link protocol (RLP) transmissions that allow, among other things, the re-transmission and re-ordering of packets sent over the air interface, etc. An objective methodology to assess the delay of multimedia transmissions is to observe the encoded stream. For example, a transmission can not be decoded until a complete, independently decodable, packet has been received. Thus, delay can be affected by the size of the packets and the rate of transmission.

For example, if a packet is 64 kbytes in size, and it is transmitted over a 64 kbytes per second channel, then the packet cannot be decoded, and must be delayed, for 1 sec until the entire packet is received. All packets that are received would need to be delayed enough to accommodate the largest packet, so that packets can be decoded at a constant rate. For example, if video packets, or varying size, are transmitted, a receiver would need to delay, or buffer, all of the received packets by an amount equal to the delay needed to accommodate the largest packet size. The delay would permit the decoded video to be rendered, or displayed, at a constant rate. If the maximum packet size is not known ahead of time then estimates of the maximum packet size, and associated delay, can be made based on the parameters used during the encoding of the packets.

The technique just described can be used in assessing the delay for any video codec (H.263, AVC/H.264, MPEG-4, etc.). Further, given that only video decoders are normatively specified by the Motion Picture Expert Group (MPEG) and the International Telecommunication Union (ITU), it is useful to have an objective measure that can be used to estimate the delays introduced by different encoder implementations for mobiles in typical wireless deployments.

In general, video streams will have more delay than other types of data in multimedia services, for example, more delay than speech, audio, timed text, etc. Because of the longer delay typically experienced by a video stream, other multimedia data that needs to be synchronized with the video data will usually need to be intentionally delayed in order to maintain synchronization with video.

Encoder/Decoder Delays

In some multimedia encoding techniques, multimedia data frames are encoded or decoded using information from a previous reference multimedia data frame. For example, video codecs implementing the MPEG-4 standard will encode and decode different types of video frames. In MPEG-4, video is typically encoded into an "I" frame and a "P" frame. An I frame is self-contained, that is, it includes all of the information needed to render, or display, one complete frame of video. A P frame is not self-contained and will typically contain differential information relative to the previous frame, such as motion vectors and differential texture information. Typically, I frames are about 8 to 10 times larger that a P frame, depending on the content and encoder settings. Encoding and decoding of multimedia data introduces delays that may depend on the processing resources available. A typical implementation of this type of scheme may utilize a ping-pong buffer to allow the processing resources to simultaneously capture or display one frame and process another.

Video encoders such as H.263, AVC/H.264, MPEG-4, etc. are inherently variable rate in nature because of predictive coding and also due to the use of variable length coding (VLC) of many parameters. Real time delivery of variable rate bitstreams over circuit switched networks and packet switched networks is generally accomplished by traffic shaping with buffers at the sender and receiver. Traffic shaping buffers introduces additional delay which is typically undesirable. For example, additional delay can be annoying during teleconferencing when there is delay between when a person speaks and when another person hears the speech.

The encoder and decoder delays can affect the amount of time that the encoders and decoders have to process multimedia data. For example, an upper bound on the time allowed for an encoder and decoder to process data and maintain a desired frame rate is given by:

$$\Delta_e = \Delta_d = 1/f \qquad \text{Eq. 1}$$

where $\Delta_e$ and $\Delta_d$ represent the encoder and decoder delays, respectively; and f is the desired frame rate, in frames per second (fps), for a given service.

For example, video data typically has desired frame rates are 15 fps, 10 fps, or 7.5 fps. An upper bound on the time allowed for an encoder and decoder to process the data and maintain the desired frame rate results in upper bounds of 66.6 ms, 100 ms and 133 ms respectively frames rates of 15 fps, 10 fps, or 7.5 fps respectively.

Rate Control Buffer Delay

In general, to maintain a consistent perceptual quality of a multimedia service, a different number of bits may be required for different frames. For example, a video codec may need to use a different number of bytes to encode an I frame than a P frame to maintain a consistent quality. Thus, to maintain consistent qualify and a constant frame rate results in the video stream being a variable bit rate stream. Consistent quality at an encoder can be achieved by setting an encoder "Quantization parameter" ($Q_p$) to a constant value or less variable around a target $Q_p$.

Figure 4:
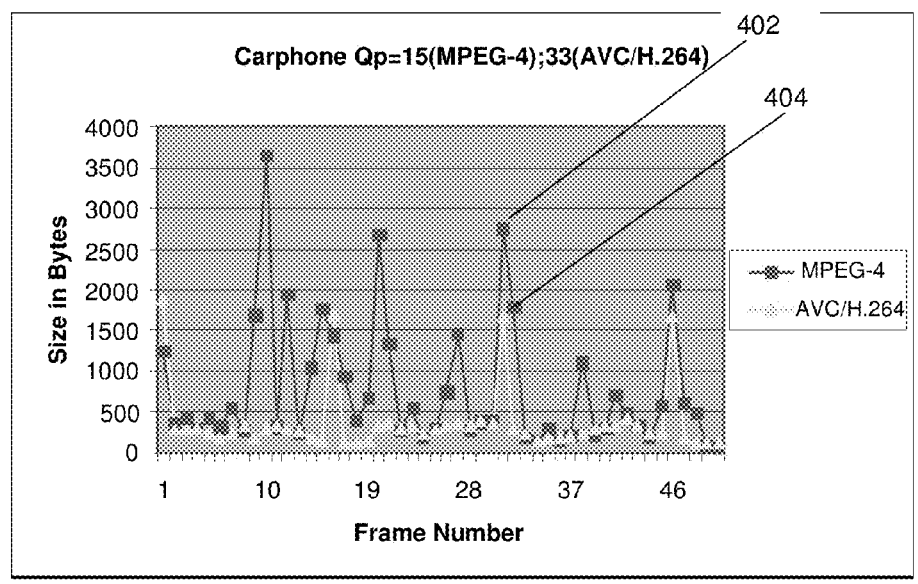
FIG. 4 is a chart illustrating an example of variation in frame sizes for a typical video sequence in the FIG. 1 system.

FIG. 4 is a chart illustrating an example of variation in frame sizes for a typical video sequence entitled "Carphone." The Carphone sequence is a standard video sequence, that is well know to those in the art, and it is used to provide a "common" video sequence for use in evaluating various techniques, such as video compression, error correction and transmission. FIG. 4 shows an example of the variation in frame size, in bytes, for a sample number of frames of Carphone data encoded using MPEG-4 and AVC/H.264 encoding techniques indicated by references 402 and 404 respectively. A desired quality of encoding can be achieved by setting the encoder parameter "Qp" to a desired value. In FIG. 4, the Carphone data is encoded using an MPEG encoder with Qp=33 and using an AVC/H.264 encoder with Qp=33. When the encoded data streams illustrated in FIG. 4 are to be transmitted over a constant bit rate (CBR) channel, such as a typical wireless radio channel, the variations in frame size would need to be "smoothed out" to maintain a constant, or negotiated, QoS bitrate. Typically, this "smoothing out" of the variations in frame size results in an introduction of additional delay, commonly called buffering delay $\Delta_b$.

Figure 5:
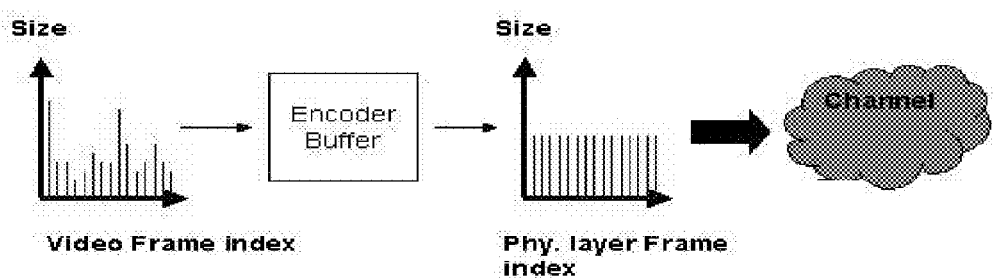
FIG. 5 is a block diagram illustrating buffering delay used to support the transmission of frames of various sizes to be transmitted over a CBR channel in the FIG. 1 system.

FIG. 5 is a block diagram illustrating how buffering delay can be used to support the transmission of frames of various sizes to be transmitted over a CBR channel. As shown in FIG. 5, data frames of varying size 502 enter the buffer 504. The buffer 504 will store a sufficient number of frames of data so that data frames that are a constant size can be output from the buffer 506 for transmission over a CBR channel 508. A buffer of this type is commonly referred to as a "leaky bucket" buffer. A "leaky bucket" buffer outputs data at a constant rate, like a bucket with a hole in the bottom. If the rate at which water enters the bucket varies, then the bucket needs to maintain a sufficient amount of water in the bucket to prevent the bucket from running dry when the rate of the water entering the bucket falls to less than the rate of the leak. Likewise, the bucket needs to be large enough so that the bucket does not overflow when the rate of the water entering the bucket exceeds the rate of the leak. The buffer 504 works in a similar way to the bucket and the amount of data that the buffer needs to store to prevent buffer underflow results in delay corresponding the length of time that the data stays in the buffer.

Figure 6:
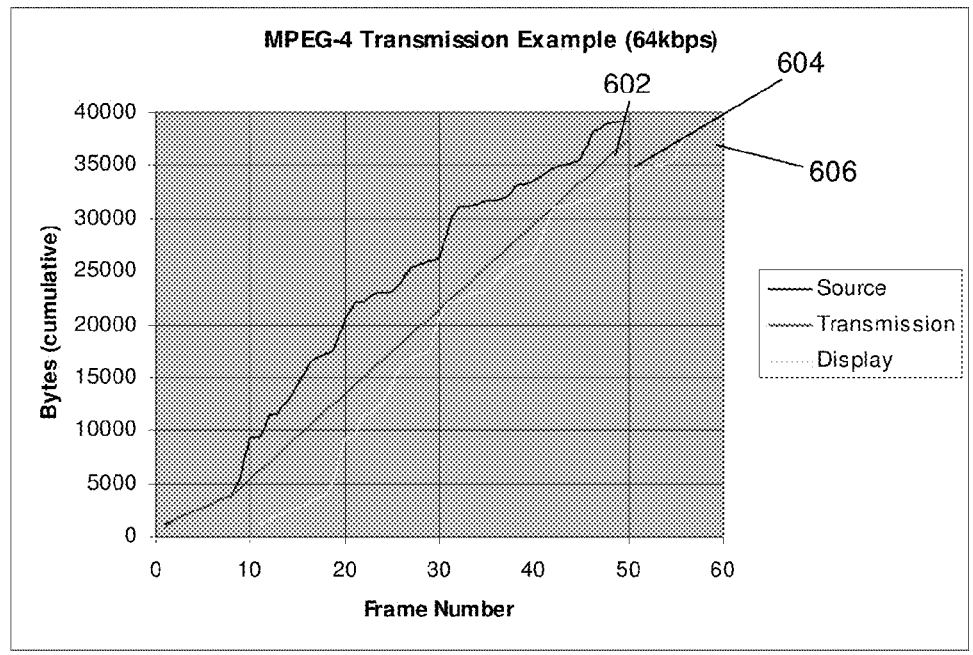
FIG. 6 is a graph illustrating buffering delay introduced by streaming a variable bit rate (VBR) multimedia stream over a CBR channel in the FIG. 1 system.

FIG. 6 is a graph illustrating buffering delay introduced by streaming a variable bit rate (VBR) multimedia stream over a CBR channel in the FIG. 1 system. As illustrated in FIG. 6, a video signal is encoded using a VBR encoding scheme, MPEG-4, producing a VBR stream. The number of bytes in the VBR stream is illustrated in FIG. 6 by a line 602 representing the cumulative, or total, number of bytes required to transmit a given number of video frames. In this example, the MPEG-4 stream is encoded at an average bit rate of 64 kbps and is transmitted over a 64 kbps CBR channel. The number of bytes that are transmitted by the CBR channel is represented by a constant slope line 604 corresponding to the constant transmission rate of 64 kps.

To avoid buffer underflow at the decoder, due to insufficient data received at the decoder to allow a full video frame to be decoded, the display, or playout, 606 at the decoder needs to be delayed. In this example, the delay is 10 frames, or 1 second, for a desired display rate of 10 fps. In this example, a constant rate of 64 kbps was used for the channel, but if an MPEG-4 stream that has an average data rate 64 kbps is transmitted over a 32 kbps CBR channel, the buffering delay would increase with the length of the sequence. For example, for the 50-frame sequence illustrated in FIG. 6, the buffering delay would increase to 2 seconds.

In general, the buffering delay $\Delta_b$ due to buffer underflow constraints can be computed as follows:

$$B(i) = \sum_{j=0}^{i} R(i) - \sum_{j=0}^{i} C(i) \qquad \text{Eq. 2}$$

$$B(i) \geq 0$$

$$C(i) = BW(i)/f * 8 \qquad \text{Eq. 3}$$

where:
B(i)=Buffer occupancy at the encoder in bytes at time i (video frame #i)
R(i)=Encoder output in bytes at time i (video frame #i)
C(i)=Number of bytes that can be transmitted in one frame tick i
f=Desired number of frames per second
BW(i)=Available bandwidth at time i
Note that for the special case of CBR transmission, $$C(i) = C \forall i \qquad \text{Eq. 4}$$

To avoid decoder buffer underflow, or buffer starvation, during the entire presentation, play out has to be delayed by the time required to transmit the maximum buffer occupancy at the encoder. Thus, the buffering delay can be represented as:

$$\Delta_b = \max\left\{ \frac{Be(i)}{1/I \sum_{i=1}^{I} C(i)} \right\} \qquad \text{Eq. 5}$$

The denominator in Equation 5 represents the average data rate for the entire session duration I. For a CBR channel assignment, the denominator is C. The above analyses can also be used to estimate nominal encoder buffer sizes required to avoid overflow at encoder by computing $\max\{Be(i)\}$ for all i in a set of exemplar sequences.

MPEG-4 and AVC/H.264 Buffer Delay Example

Figure 7:
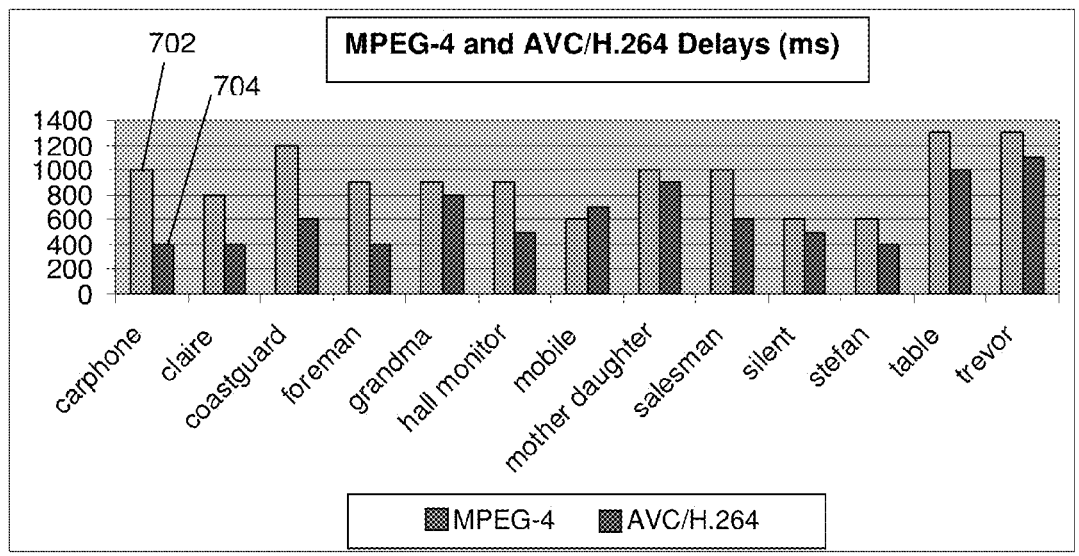
FIG. 7 is a bar graph illustrating buffer delay $\Delta_b$ in milliseconds, for various 50 frame sequence video clips encoded with nominal rate of 64 kbps and constant Qp for AVC/H.264 and MPEG-4 in the system.

FIG. 7 is a bar graph illustrating buffer delay $\Delta_b$ in milliseconds, for various 50 frame sequence video clips encoded with nominal rate of 64 kbps and constant Qp for AVC/H.264 and MPEG-4. As shown in FIG. 7, the MPEG-4 frame sequence of FIG. 6 is represented by a bar 702 indicating a buffer delay of 1000 ms. The same video sequence encoded using AVC/H.264 is represented by a bar 704 indicating a buffer delay of 400 ms. Additional examples of 50 frame sequences of video clips are shown in FIG. 7, where the buffer delay associated with each sequence, encoded with both MPEG-4 and AVC/H.264 are indicated.

Figure 8:
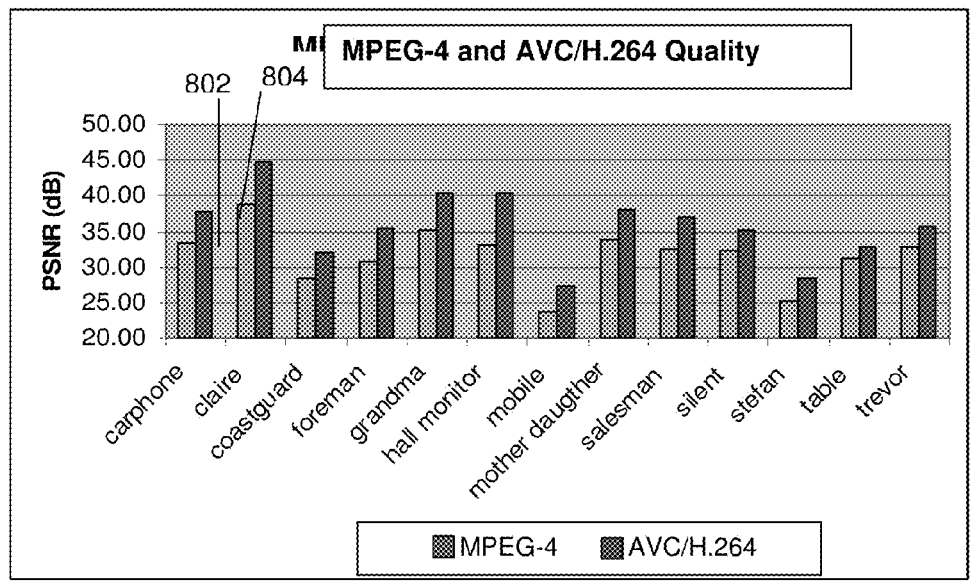
FIG. 8 is a bar graph illustrating the visual quality, as represented by the well understood objective metric "peak signal to noise ratio" (PSNR), of the sequences illustrated in FIG. 7.

FIG. 8 is a bar graph illustrating the video quality, as represented by peak signal to noise ratio (PSNR), of the sequences illustrated in FIG. 7. As shown in FIG. 8, the Carphone sequence encoded using MPEG-4 with Qp=15 is represented by a bar 802 indicating a PSNR of about 28 dB. The same sequence encoded using AVC/H.264 with Qp=33 is indicated by a bar 804 indicating a PSNR of about 35 dB.

Transmission Channel Delay

Transmission delay $\Delta_t$ depends on the number of retransmissions used and certain constant time for a given network. It can be assumed that $\Delta_t$ has a nominal value when no retransmissions are used. For example, it may be assumed that $\Delta_t$ has a nominal value of 40 ms when no retransmissions are used. If retransmissions are used, Frame Erasure Rate (FER) drops, but the delay will increase. The delay will depend, at least in part, on the number of retransmissions and associated overhead delays.

Error Resiliency Considerations

Figure 9:
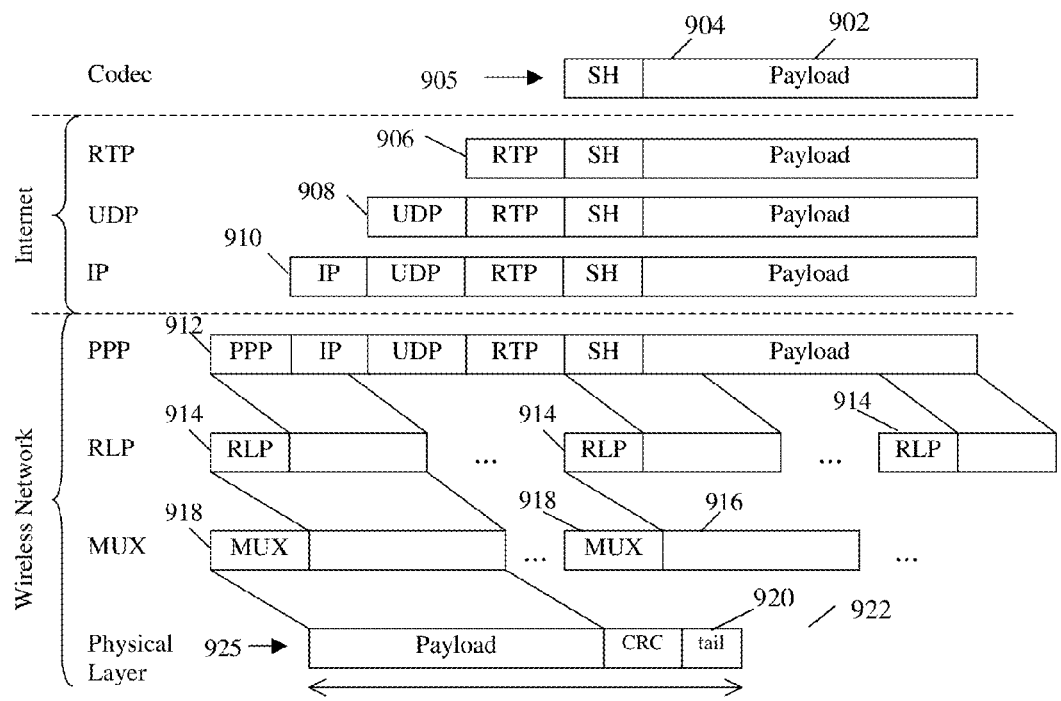
FIG. 9 is a diagram illustrating various levels of encapsulation present when transmitting multimedia data, such as video data, over a wireless link using the RTP/UDP/IP protocol in the system.

When transmitting RTP streams over a wireless link, or channel, there will generally be some residual packet losses because RTP streams are delay sensitive and ensuring 100% reliable transmission by means of a re-transmission protocol, such as RLP or RLC, is not practical. To assist in understanding the effect of channel errors a description of various protocols, such as the RTP/UDP/IP protocol are provided below. FIG. 9 is a diagram illustrating various levels of encapsulation present when transmitting multimedia data, such as video data, over a wireless links using the RTP/UDP/IP protocol.

As shown in FIG. 9, a video codec generates a payload, 902 that includes information describing a video frame. The payload 902 may be made up of several video packets (not depicted). The payload 902 includes a Slice_Header (SH) 904. Thus, an application layer data packet 905 consists of the video data 902 and the associated Slice_Header 904. As the payload passes through a network, such as the Internet, additional header information may be added. For example, a real-time protocol (RTP) header 906, a user datagram protocol (UDP) header 908, and an Internet protocol (IP) header 910 may be added. These headers provide information used to route the payload from its source to its destination.

Upon entering the wireless network, a point to point protocol (PPP) header 912 is added to provide framing information for serializing the packets into a continuous stream of bits. A radio link protocol, for example, RLP in cdma2000 or RLC in W-CDMA, then packs the stream of bits into RLP packets 914. The radio-link protocol allows, among other things, the re-transmission and re-ordering of packets sent over the air interface. Finally, the air interface MAC-layer takes one or more RLP packets 914, packs them into MUX layer packet 916, and adds a multiplexing header (MUX) 918. A physical layer channel coder then adds a checksum (CRC) 920 to detect decoding errors, and a tail part 922 forming a physical layer packet 925.

The successive uncoordinated encapsulations illustrated in FIG. 9, has several consequences on the transmission of multimedia data. One such consequence is that there may be a mismatch between application layer data packets 905 and physical layer packets 925. As a result of this mismatch, each time a physical layer packet 925 containing portions of one or more application layer packets 905 is lost, the corresponding entire application layer 905 is lost. Because portions of a single application layer data packet 905 may be included in more than one physical layer data packet 925, losing one physical layer packet 925 can result in the loss of an entire application layer packet 905 because the entire application layer data packet 905 is needed to be properly decoded. Another consequence is that if portion of more than one application layer data packets 905 is included in a physical layer data packet 925, then the loss of a single physical layer data packet 925 can result in the loss of more than one application layer data packets 905.

Figure 10:
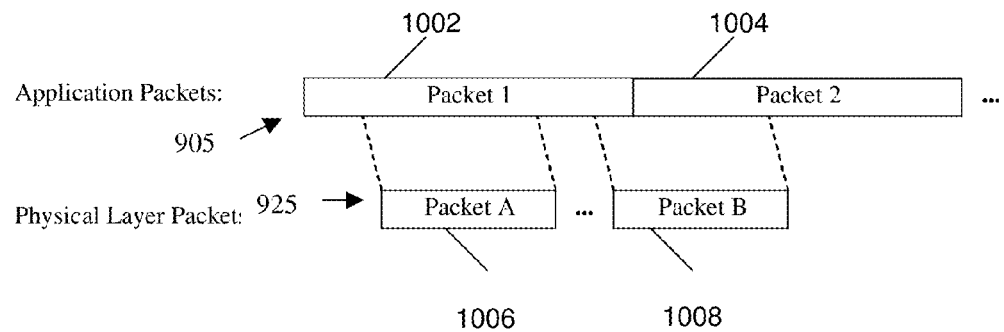
FIG. 10 is a diagram illustrating an example of the allocation of application data packets, such as multimedia data packets, into physical layer data packets in the system.

FIG. 10 is a diagram illustrating an example of conventional allocation of application data packets 905 such as multimedia data packets, into physical layer data packets 925. Shown in FIG. 10, are two application data packets 1002 and 1004. The application data packets can be multimedia data packets, for example each data packet 1002 and 1004 can represent video frames. The uncoordinated encapsulations illustrated in FIG. 10 can result in a physical layer packet having data that is from a single application data packet or from more than one application data packet. As shown in FIG. 10, a first physical layer data packet 1006 can include data from a single application layer packet 1002, while a second physical layer data packet 1008 can include data from more that one application data packet 1002 and 1004. In this example, if the first physical layer data packet 1006 is "lost", or corrupted during transmission, then a single application layer data packet 1002 is lost. On the other hand if the second physical layer data packet 1008 is lost, then two application data packets 1002 and 1004 are also lost.

For example, if the application layer data packets are two successive video frames, then the loss of the first physical layer data packet 1006 results in the loss of a single video frame. But, loss of the second physical layer data packet results in the loss of both video frames because portions of both video frames are lost neither of the video frames can be properly decoded, or recovered, by a decoder.

Explicit Bit Rate (EBR) Control

Use of a technique referred to as explicit bit rate control (EBR), rather that CBR or VBR, can improve the transmission of a VBR source over a CBR channel. In EBR information units are partitioned into data packets such that the size of the data packets matches a size of an available physical layer packet. For example, a VBR stream of data, such as a video data, may be partitioned into data packets so that the application layer data packets match the physical layer data packets of a communication channel that the data is going to be transported over. For example, in EBR an encoder may be constrained, or configured, to output bytes at time i (previously denoted R(i)) that match "the capacity" of the physical channel used to deliver the data stream in any over-the-air standard, such as, GSM, GPRS, EDGE, TIA/EIA-95-B (IS-95), TIA/EIA-98-C (IS-98), cdma2000, Wideband CDMA (WCDMA), and others. In addition, the encoded packets may be constrained so that it produces data packets that are sized, i.e. the same number of bytes or less, than the size of the physical layer data packets of the communication channel. Also, the encoder can be constrained so that each application layer data packet that it outputs is independently decodable. Simulations of the EBR technique, on a AVC/H.264 reference encoder, show that there is no perceivable loss in quality when the encoder is constrained in accordance with the EBR techniques, provided adequate number of explicit rates are used to constrain the VBR encoding. Examples of constraints for some channels are described below as examples.

Multimedia Encoding and Decoding

As noted, multimedia encoders, for example video encoders, may generate multimedia frames of variable size. For example, in some compression techniques, each new multimedia frame may include all of the information needed to fully render the frame content, while other frames may include information about changes to the content from a previously fully rendered content. For example, as noted above, in a system based on MPEG-4 compression techniques, video frames may typically be of two types: I or P frames. I frames are self-contained, similar to JPEG files, in that each I frame contains all the information needed to render, or display, one complete frame. In contrast, P frames typically include information relative to the previous frame, such as, differential information relative to the previous frame and motion vectors. Therefore, because P frames rely on previous frames, a P frame is not self-contained, and cannot render, or display, a complete frame without reliance on a previous frame, in other words a P frame cannot be self-decoded. Here, the word "decoded" is used to mean full reconstruction for displaying a frame. Typically, I frames are larger than P frames, for example, about 8 to 10 times larger depending on the content and encoder settings.

In general, each frame of data can be partitioned into portions, or "slices", such that each slice can be independently decoded, as described further below. In one case, a frame of data may be contained in a single slice, in other cases a frame of data is divided into multiple slices. For example, if the frame of data is video information, then the video frame may be include within a independently decodable slice, or the frame may be divided into more than one independently decodable slice. In one embodiment, each encoded slice is configured so that the size of the slice matches an available size of a communication channel physical layer data packet. If the encoder is encoding video information then each slice is configured such that the size of each video slice matches an available size of a physical layer packet. In other words, frame slice sizes are matched to physical layer packet sizes.

Advantages to making slices a size that matches an available communication channel physical layer data size is that there is a one to one correspondence between the application packets and the physical layer data packets. This helps alleviate some of the problems associated with uncoordinated encapsulation as illustrated in FIG. 10. Thus, if a physical layer data packet is corrupted, or lost, during transmission only the corresponding slice is lost. Also, if each slice of a frame is independently decodable, then the loss of a slice of a frame will not prevent the decoding of the other slices of the frame. For example, if a video frame is divided into five slices, such that each slice is independently decodable and matched to a physical layer data packet, then corruption, or loss, of one of the physical layer data packets will result in the loss of only the corresponding slice and the physical layer packets that are successfully transmitted can be successfully decoded. Thus, although the entire video frame may not be decoded, portions of it may be. In this example, four of the five video slices will be successfully decoded, and thereby allow the video frame to be rendered, or displayed, albeit at reduced performance.

For example, if video slices are communicated from a sending node to a MS, in a system based on cdma2000, using the DCCH and SCH channels then the video slices will be sized to match these available channels. As noted above, the DCCH channel can be configured to support multiple, fixed, data rates. In a system based on cdma2000, for example, the DCCH can support data transmission rates of either 9.60 kbps or 14.4 kbps depending on the selected rate set (RS), RS1 and RS2 respectively. The SCH channel can also be configured to support multiple, fixed data rates, depending on the SCH radio configuration (RC). The SCH supports multiples of 9.6 kps when configured in RC3 and multiples of 14.4 kps when configured as RC5. The SCH data rates are:

$$SCH_{DATA\_RATE} = (n * RC \text{ data rate}) \qquad \text{Eq. 6}$$

where n=1, 2, 4, 8, or 16 depending on the channel configuration.

Table 2, below, illustrates possible physical layer data packet sizes for the DCCH and SCH channels in a communication system based on cdma2000. The first column identifies a case, or possible configuration. The second and third columns are the DCCH rate set and SCH radio configuration respectively. The fourth column has four entries. The first is the dtx case where no data is sent on either DCCH or SCH. The second is the physical layer data packet size of a 20 ms time slot for the DCCH channel. The third entry is the physical layer data packet size of a 20 ms time slot for the SCH channel. The fourth entry is the physical layer data packet size of a 20 ms time slot for a combination of the DCCH and SCH channels.

TABLE 2

Possible Physical Layer Packet Sizes for Combinations of DCCH and SCH

| | | | Physical Layer Packet Sizes (bytes) | | | |
|---|---|---|---|---|---|---|
| Case | DCCH Configuration | SCH Configuration | dtx, | DCCH | SCH | DCCH + SCH |
| 1 | RS1 | 2x in RC3 | 0, | 20, | 40, | 60 |
| 2 | RS1 | 4x in RC3 | 0, | 20, | 80, | 100 |
| 3 | RS1 | 8x in RC3 | 0, | 20, | 160, | 180 |
| 4 | RS1 | 16x in RC3 | 0, | 20 | 320 | 340 |
| 5 | RS2 | 2x in RC3 | 0, | 31, | 40, | 71 |
| 6 | RS2 | 4x in RC3 | 0, | 31, | 80, | 111 |
| 7 | RS2 | 8x in RC3 | 0, | 31, | 160, | 191 |
| 8 | RS2 | 16x in RC3 | 0, | 31, | 320, | 351 |
| 9 | RS1 | 2x in RC5 | 0, | 20, | 64, | 84 |
| 10 | RS1 | 4x in RC5 | 0, | 20, | 128, | 148 |
| 11 | RS1 | 8x in RC5 | 0, | 20, | 256, | 276 |
| 12 | RS1 | 16x in RC5 | 0, | 20, | 512 | 532 |
| 13 | RS2 | 2x in RC5 | 0, | 31, | 64, | 95 |
| 14 | RS2 | 4x in RC5 | 0, | 31, | 128, | 159 |
| 15 | RS2 | 8x in RC5 | 0, | 31, | 256, | 287 |
| 16 | RS2 | 16x in RC5 | 0, | 31, | 512 | 543 |

It should be noted that there is a tradeoff to be considered when an application layer data packet is too large to fit into the DCCH or SCH physical layer data packets and instead a combined DCCH plus SCH packet is going to be used. A tradeoff in deciding to encode an application layer data packet so that it is sized to fit into a combined DCCH plus SCH data packet size, versus making two packets, is that a larger application layer packet, or slice, generally produces better compression efficiency, while smaller slices generally produce better error resiliency. For example, a larger slice generally requires less overhead. Referring to FIG. 9, each slice 902 has its own slice header 904. Thus, if two slices are used instead of one, there are two slice headers added to the payload, resulting in more data needed to encode the packet and thereby reducing compression efficiency. On the other hand, if two slices are used, one transmitted on the DCCH and the other transmitted on the SCH, then corruption, or loss, of only one of either the DCCH or SCH data packets would still allow recovery of the other data packet, thereby improving error resiliency.

To help in understanding Table 2 the derivation of Case 1 and 9 will be explained in detail. In Case 1 DCCH is configured as RS1 corresponding to a data rate of 9.6 Kbps. Because the channels are divided into 20 ms time slots, within an individual time slot the amount of data, or physical layer packet size, that can be transmitted on DCCH configured RS1 is:

$$9600 \text{ bits/sec} * 20 \text{ msec} = 192 \text{ bits} = 24 \text{ bytes} \qquad \text{Eq. 7}$$

Because of additional overhead that is added to physical layer packet, for example, RLP for error correction, only 20 bytes are available for the application layer data packet, which includes the slice and the slice header. Thus, the first entry in the fourth column of Table 2, for Case 1 is 20.

The SCH for Case 1 in is configured as 2× in RC3. RC3 corresponds to a base data rate of 9.6 Kbps and the 2× means that the channel data rate is two times the base data rate. Thus, within an individual time slot the amount of data, or physical layer packet size, that can be transmitted on SCH configured 2× RC3 is:

$$2*9600 \text{ bits/sec} * 20 \text{ msec} = 384 \text{ bits} = 48 \text{ bytes} \qquad \text{Eq. 8}$$

Here, because of additional overhead that is added to physical layer packet, only 40 bytes are available for the application layer data packet, which includes the slice and the slice header. Thus, the second entry in the fourth column of Table 2, for Case 1 is 40. The third entry in the fourth column of Table 2 for Case 1 is the sum of the first and second entries, or 60.

Case 9 is similar to Case 1. In both cases the DCCH is configured RS1, corresponding to a physical layer packet size of 20 bytes. The SCH channel in Case 9 is configured 2× RC5. RC5 corresponds to a base data rate of 14.4 Kbps and the 2× means that the channel data rate is two times the base data rate. Thus, within an individual time slot the amount of data, or physical layer packet size, that can be transmitted on SCH configured 2× RC5 is:

$$2*14400 \text{ bits/sec} * 20 \text{ msec} = 576 \text{ bits} = 72 \text{ bytes} \qquad \text{Eq. 9}$$

Here, because of additional overhead that is added to physical layer packet, only 64 bytes are available for the application layer data packet, which includes the slice and the slice header. Thus, the second entry in the fourth column of Table 2, for Case 9 is 64. The third entry in the fourth column of Table 2 for Case 9 is the sum of the first and second entries, or 84.

The other entries in Table 2 are determined in a similar manner, where RS2 corresponds to DCCH having a data rate of 14.4 Kbps, corresponding to 36 bytes within a 20 msec time slot of which 31 are available to the application layer. It is noted that there is the dtx operation available for all cases, and that is zero payload size, where no data is transmitted on either channel. When the user data can be transmitted in fewer than the available physical layer slots (of 20 ms each), dtx is used in the subsequent slots, reducing the interference to other users in the system.

As illustrated in Table 2 above, by configuring the multiple fixed data rate channels available, for example DCCH and SCH, a set of CBR channels can behave similarly to a VBR channel. That is, configuring the multiple fixed rate channels can make a CBR channel behave as a pseudo-VBR channel. Techniques that take advantage of the pseudo-VBR channel include determining possible physical layer data packet sizes corresponding to a CBR channel's bit rate from a plurality of available constant bit rate communication channels, and encoding a variable bit rate stream of data thereby creating a plurality of data packets such that a size of each of the data packets is matched to a size of one of the physical layer data packets sizes.

In one embodiment, the configuration of the communication channels is established at the beginning of a session and then either not changed through out the session or only changed infrequently. For example, the SCH discussed in the above example is generally set to a configuration and remains in that configuration through out the entire session. That is, the SCH described is a fixed rate SCH. In another embodiment, the channel configuration can be changed dynamically during the session. For example a variable rate SCH (V-SCH) can change its configuration for each time slot. That is, during one time slot a V-SCH can be configured in one configuration, such as 2× RC3, and in the next time slot the V-SCH can be configured to a different configuration, such as 16×RC3 or any other possible configuration of V-SCH. A V-SCH provides additional flexibility, and can improve system performance in EBR techniques.

If the configuration of the communication channel is fixed for the entire session, then application layer packets, or slices, are selected so that that they fit into one of the available physical layer data packets that are available. For example, if the DCCH and SCH are configured as RS1 and 2×RC3, as illustrated in Case 1 in Table 2, then the application layer slices would be selected to fit into either 0 byte, 20 byte, 40 byte, or 60 byte packets. Likewise, if the channels were configured as RS1 and 16×RC3, as illustrated in Case 4 of Table 2, then the application layer slices would be selected to fit into either 0 byte, 20 byte, 320 byte, or 340 byte packets. If a V-SCH channel were used then it is possible to change between two different configurations for each slice. For example, if the DCCH is configured as RS1 and V-SCH is configured as RC3, then it is possible to change between any of the V-SCH configurations 2×RC3, 4×RC3, 8×RC3, or 16×RC3, corresponding to Cases 1-4 of Table 2. Selection between these various configurations provides physical layer data packets of 0 byte, 20 byte, 40 byte, 60 byte, 80 byte, 100 byte, 160 byte, 180 byte, 320 byte, or 340 byte as illustrated in Cases 1-4 of Table 2. Thus, in this example, using a V-SCH channel allows application layer slices to be selected to fit into any of the ten different physical layer data packet sizes listed in Cases 1-4 of Table 2. In the case of cdma2000, the size of the data delivered is estimated by the MS and this process is called "Blind Detection"

A similar technique can be used in Wideband CDMA (WCDMA) using a Data Channel (DCH). DCH, similarly to V-SCH, supports different physical layer packet sizes. For example, DCH can support rates of 0 to nx in multiples of 40 octets, where 'nx' corresponds to the maximum allocated rate of the DCH channel. Typical values of nx include 64 kbps, 128 kbps and 256 kbps. In a technique referred to as "Explicit Indication" the size of the data delivered can be indicated using additional signaling, thereby eliminating the need to do blind detection. For example, in the case of WCDMA, the size of the data packet delivered may be indicated using "Transport Format Combination Indicator" (TFCI), so that the MS does not have to do blind detection, thereby reducing the computational burden on the MS, when packets of variable sizes are used as in EBR. The EBR concepts described are applicable to both blind detection and explicit indication of the packet sizes.

By selecting application layer data packets so that they fit into the physical layer data packets, a combination of constant bit rate communication channels, with their aggregate data rate, can transmit a VBR data stream with performance similar to, and in some cases superior to, a VBR communication channel. In one embodiment, a variable bit rate data stream is encoded into a stream of data packets that are of a size that matches the physical layer data packet size of available communication channels, and are then transmitted over a combination of constant bit rate channels. In another embodiment, as the bit rate of the variable bit rate data stream varies it may be encoded into different sized data packets and a different combinations of constant bit rate channels may be used to transmit the data packets.

For example, different frames of video data may be different sizes and thus, different combinations of fixed bit rate communication channels may be selected to accommodate the transmission of the different sized video frames. In other words, variable bit rate data can be efficiently transmitted over a constant bit rate channel by assigning data packets to at least one of the constant bit rate communication channels so as to match the aggregate bit rate of the constant bit rate communication channels to the bit rate of the variable bit rate stream.

Another aspect is that the encoder can be constrained so as to limit the total number of bits used to represent the variable bit rate data stream to a pre-selected maximum number of bits. That is, if the variable bit rate data stream is a frame of multimedia data, such as video, the frame may be divided into slices where the slices are selected such that each slice can be independently decoded and the number of bits in the slice is limited to a pre-selected number of bits. For example, if the DCCH and SCH channels are configured RS1 and 2×RC3 respectively (Case 1 in Table 2) then the encoded can be constrained so that a slice will be no larger that either 20 bytes, 40 bytes or 60 bytes.

In another embodiment using EBR to transmit multimedia data can use the cdma2000 packet data channel (PDCH). The PDCH can be configured to transmit data packets that are n*45 bytes, where n={1, 2, 4, 8}. Again, using the PDCH for the multimedia data, for example video data, can be partitioned into "slices" the match the available physical layer packet sizes. In cdma2000, the PDCH has different data rates available of the forward PDCH (F-PDCH) and the reverse PDCH (R-PDCH). In cdma2000 the F-PDCH has slightly less bandwidth available than the R-PDCH. While this difference in bandwidth can be taken advantage of, in some cases it is advantageous to limit the R-PDCH to the same bandwidth as the F-PDCH. For example, if a first MS transmits a video stream to a second MS, the video stream will be transmitted by the first MS on the R-PDCH and received by the second MS on the F-PDCH. If the first MS used the entire bandwidth of the R-PDCH then some of the data stream would have to be removed to have it conform to the bandwidth of the F-PDCH transmission to the second MS. To alleviate difficulties associated with reformatting the transmission from the first MS so that it can be transmitted to the second MS on a channel with a smaller bandwidth the bandwidth of the R-PDCH can be limited so that it is the same as the F-PDCH. One way to limit the F-PDCH bandwidth is to limit the application data packet sizes sent on the R-PDCH to those supported by the F-PDCH and then add "stuffing bits" for the remaining bits in the R-PDCH physical layer packet. In other words, if stuffing bits are added to the R-PDCH data packets so as to match the F-PDCH data packets, then the R-PDCH data packets can be used on the F-PDCH forward link with minimal change, for example, by just drop the stuffing bits.

Using the technique just described, Table 3 lists possible physical layer data packet sizes for the F-PDCH and R-PDCH for four possible data rate cases, one for each value of n, and the number of "stuffing bits" that will be added to the R-PDCH.

TABLE 3

Possible Physical Layer Packet Sizes for
PDCH and "Stuffing Bits" for R-PDCH

| n | Physical Layer Packet Size (bytes) F-PDCH and R-PDCH | R-PDCH Stuffing bits |
|---|---|---|
| 1 | 45 | 0 |
| 2 | 90 | 24 |
| 4 | 180 | 72 |
| 8 | 360 | 168 |

As with EBR using DCCH plus SCH, when a multimedia stream, such as a video stream, is portioned into slices, smaller slice sizes generally improve error resiliency, but may compromise compression efficiency. Likewise, if larger slices are used, in general there will be an increase in compression efficiency, but system performance may degrade due to lost packets because the loss of an individual packet results in the loss of more data.

Likewise, the techniques of matching multimedia data, such as video slices, to an available size of a physical layer packet can be performed in systems based on other over the air standards. For example, in a system based on GSM, or GPRS, or EDGE the multimedia frames, such as video slices, can be sized to match the available timeslots. As noted above, many GSM, GPRS and EDGE devices are capable of receiving multiple timeslots. Thus, depending on the number of timeslots available, an encoded stream of frames can be constrained so that the video slices are matched to the physical packets. In other words, the multimedia data can be encoded so that packet sizes match an available size of a physical layer packet, such as the GSM timeslot, and the aggregate data rate of the physical layer packets used supports the data rate of the multimedia data.

EBR Performance Considerations

As noted, when an encoder of multimedia data streams operates in an EBR mode it generates multimedia slices matched to the physical layer, and therefore there is no loss in compression efficiency as compared to true VBR mode. For example, a video codec operating in accordance with the EBR technique generates video slices matched to the particular physical layer over which the video is transmitted. In addition, there are benefits with respect to error resilience, lower latency, and lower transmission overhead. Details of these benefits are explained further below.

Performance in Channel Errors

As discussed in reference to FIG. 10, it can be seen that in a conventional encapsulation, when a physical layer packet is lost, more than one application layer may be lost. In the EBR technique, each physical packet loss in the wireless link results in the loss of exactly one application layer packet.

Figure 11:
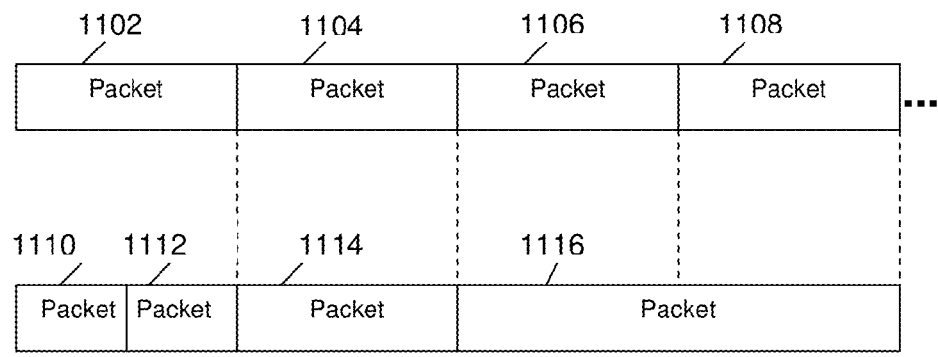
FIG. 11 illustrates an example of encoding application layer packets in accordance with the EBR technique in the system.

FIG. 11 illustrates an example of encoding application layer packets in accordance with the EBR technique. As noted above, application layer packets may be of various sizes. As discussed in Tables 2 and 3, the physical layer packets may also be of various sizes, for example, the physical layer may be made up of channels that use different sizes of physical layer data packets. In the example of FIG. 11, there are four application packets 1102, 1104, 1106, and 1108 and four physical layer packets 1110, 1112, 1114, and 1116 illustrated. Three different examples of matching the application layer packets to the physical layer packets are illustrated. First, a single application layer packet can be encoded so that it is transmitted within multiple physical layer packets. In the example shown in FIG. 11, a single physical layer packet 1102 is encoded into two physical layer packets 1110 and 1112. For example, if DCCH and SCH are configured RS1 and 2×RC3 respectively (Case 1 in Table 2) and the application data packet is 60 bytes then it could be transmitted over the two physical layer packets corresponding to the DCCH and SCH packet combination. It is envisioned that a single application layer packet can be encoded in to any number of physical layer packets corresponding to available communication channels. A second example illustrated in FIG. 11 is that a single application layer packet 1104 is encoded into a single physical layer packet 1114. For example, if the application layer data packet is 40 bytes, it could be transmitted using just the SCH physical layer data packet in Case 1 of Table 2. In both of these examples loss of a single physical layer packet results in the loss of only a single application layer packet.

A third example illustrated in FIG. 11 is that multiple application layer packets can be encoded into a single physical layer packet 1116. In the example shown in FIG. 11, two application layers 1106 and 1108 are encoded and transmitted in a single physical layer packet. It is envisioned that more that two application layer packets may be encoded to fit within a single physical layer packet. A drawback to this example is that the loss of a single physical layer packet 1116 would result in the loss of multiple application layer packets 1106 and 1108. However, there may be tradeoffs, such as full utilization of the physical layer, that would warrant encoding multiple application layer packets to be transmitted within a single physical layer packet.

Figure 12:
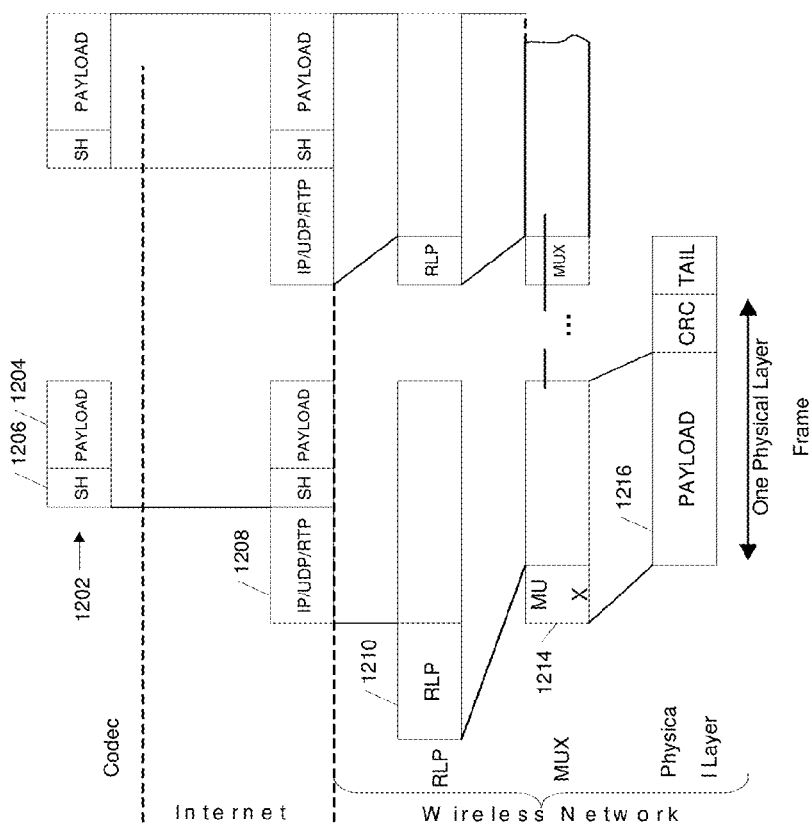
FIG. 12 is a block diagram illustrating one embodiment of a codec transmitting a VBR data stream through an IP/UDP/RTP network, such as the Internet.

FIG. 12 is a block diagram illustrating one embodiment of a codec transmitting a VBR data stream through an IP/UDP/RTP network, such as the Internet. As shown in FIG. 12 the codec generates an application layer data packet 1202 that includes a payload, or slice, 1204 and a slice header 1206. The application layer 1202 passes through the network where IP/UDP/RTP header information 1208 is appended to the application layer data packet 1202. The packet then passes through the wireless network where an RLP header 1210 and a MUX header 1212 are appended to the packet. Because the size of the IP/UDP/RTP header 1208, RLP header 1210, and MUX header 1214 are known, the codec selects a size for the slice 1204 so that the slice and all associated headers fits into the physical layer data packet, or payload, 1216.

Figure 13:
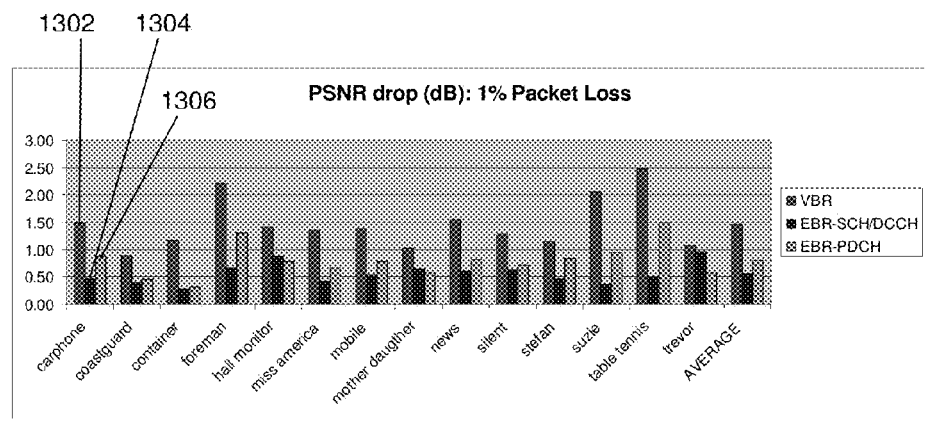
FIG. 13 is a bar graph illustrating the relative drop in peak signal to nose ratio (PSNR) for various examples of encoded video sequences, using different encoding techniques and with a channel packet loss is 1%.

FIG. 13 is a bar graph illustrating the relative drop in peak signal to noise ratio (PSNR) for various examples of encoded video sequences, using a true VBR transmission channel, and using an EBR transmission utilizing DCCH plus SCH, and PDCH, when the channel packet loss is 1%. The video sequences illustrated in FIG. 13 are standard video sequences, that are well known to those in the art, and are used to provide "common" video sequences for use in evaluating various techniques, such as video compression, error correction and transmission. As shown in FIG. 13, the true VBR 1302 sequences have the largest PSNR drop followed by the EBR using PDCH 1306 and then the EBR using DCCH plus SCH 1304. For example, in the Carphone sequence the true VBR 1302 sequence suffered approximately a 1.5 dB drop in PSNR, while the EBR using PDCH 1306 and EBR using DCCH and SCH 1304 suffered drops in PSNR of approximately 0.8 and 0.4 dB respectively. FIG. 13 illustrates that when a transmission channel experiences 1% packet loss the distortion, as measured by PSNR, for the VBR sequence is more severe than for the EBR sequences.

Figure 14:
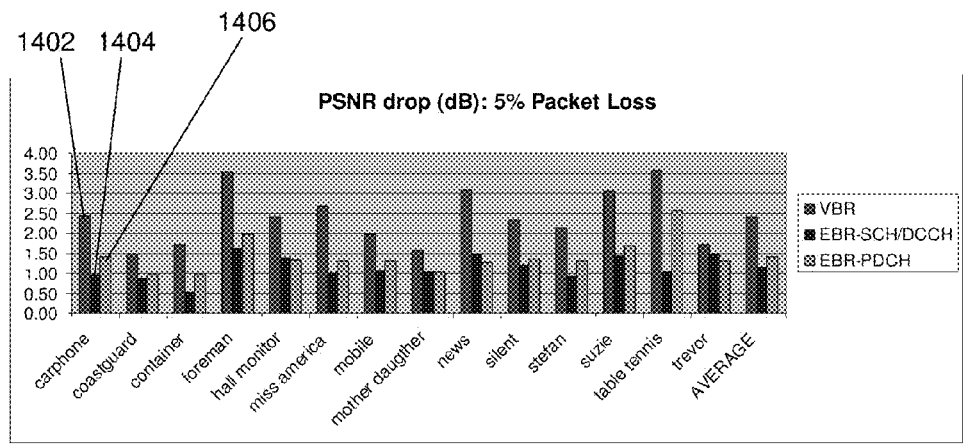
FIG. 14 is a bar graph illustrating the relative drop in peak signal to nose ratio (PSNR) when the channel loss is 5% for various examples of encoded video sequences.

FIG. 14, similar to FIG. 13, is a bar graph illustrating the relative drop in peak signal to nose ration (PSNR) when the channel loss is 5% for various examples of standard encoded video sequences, using a true VBR 1402, EBR using DCCH plus SCH 1404, and EBR using PDCH 1406. As shown in FIG. 14, the true VBR 1402 sequences have the largest PSNR drop followed by the EBR using PDCH 1406 and then the EBR using DCCH plus SCH 1404. For example, in the Carphone sequence the true VBR 1402 sequence suffered approximately a 2.5 dB drop in PSNR, while the EBR using PDCH 1406 and EBR using DCCH plus SCH 1404 suffered drops in PSNR of approximately 1.4 and 0.8 dB respectively. Comparing FIGS. 14 and 13 illustrate that when as the transmission channel packet loss increases the distortion, as measured by PSNR, for the VBR sequence is more severe than for the EBR sequences.

Figure 15:
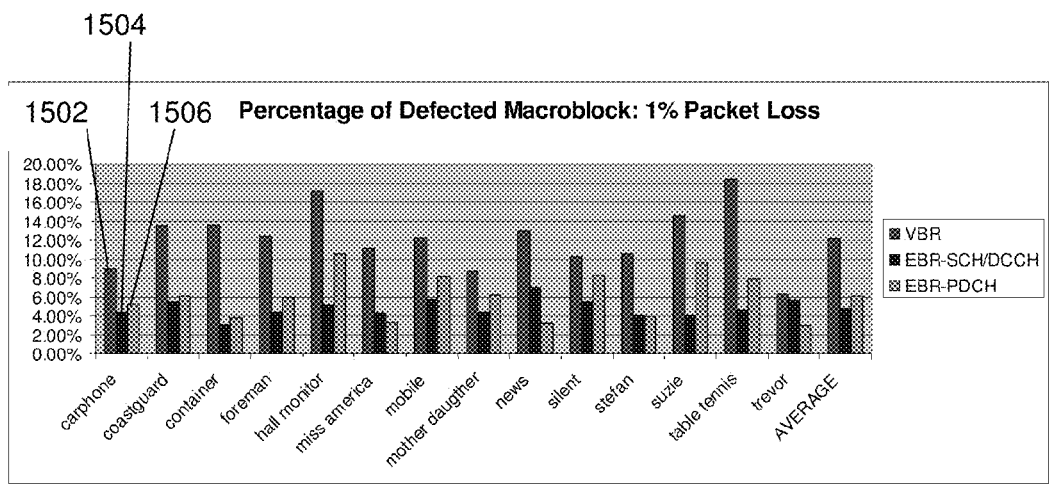
FIG. 15 is a bar graph illustrating the percentage of defective data packets received for the encoded video sequences of FIG. 13.
Figure 16:
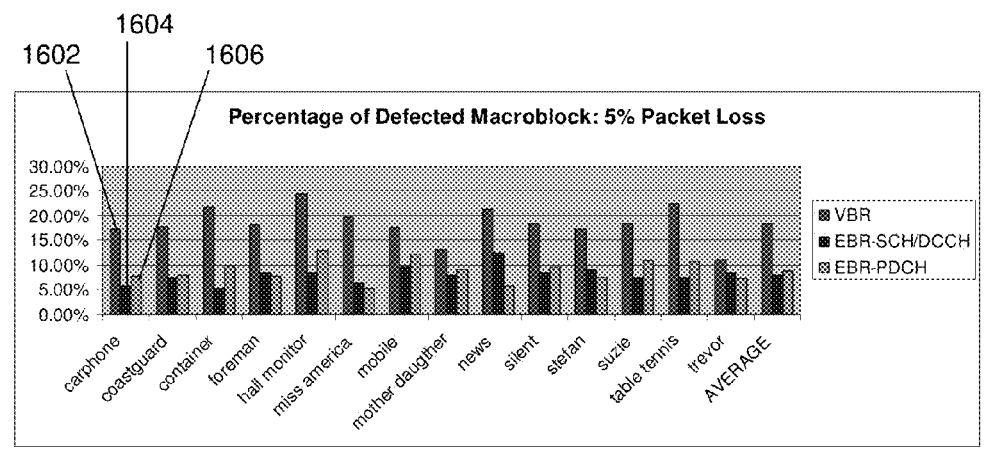
FIG. 16 is a bar graph illustrating the percentage of defective data packets received for the encoded video sequences of FIG. 14.

FIG. 15 is a bar graph illustrating the percentage of defective macroblock received for the encoded video sequences of FIG. 13, using a true VBR 1502, EBR using DCCH and SCH 1504, and EBR using PDCH 1506, when the channel packet loss is 1%. FIG. 16 is a bar graph illustrating the percentage of defective macroblocks received for the encoded video sequences of FIG. 14, using a true VBR 1602, EBR using DCCH and SCH 1604, and EBR using PDCH 1606, when the channel packet loss is 5%. Comparison of these graphs show that in both cases the percentage of defected macroblocks is greater in the VBR sequences than in the EBR sequences. It is noted that in EBR, because the slices are matched to the physical layer packet size, that the defective percentage of slices should be the same as the packet loss rate. However, because slices can include different numbers of macroblocks, loss of one data packet, corresponding to one slice, can result in a different number of defective macroblocks than the loss of a different data packet corresponding to a different slice that includes a different number of macroblocks.

Figure 17:
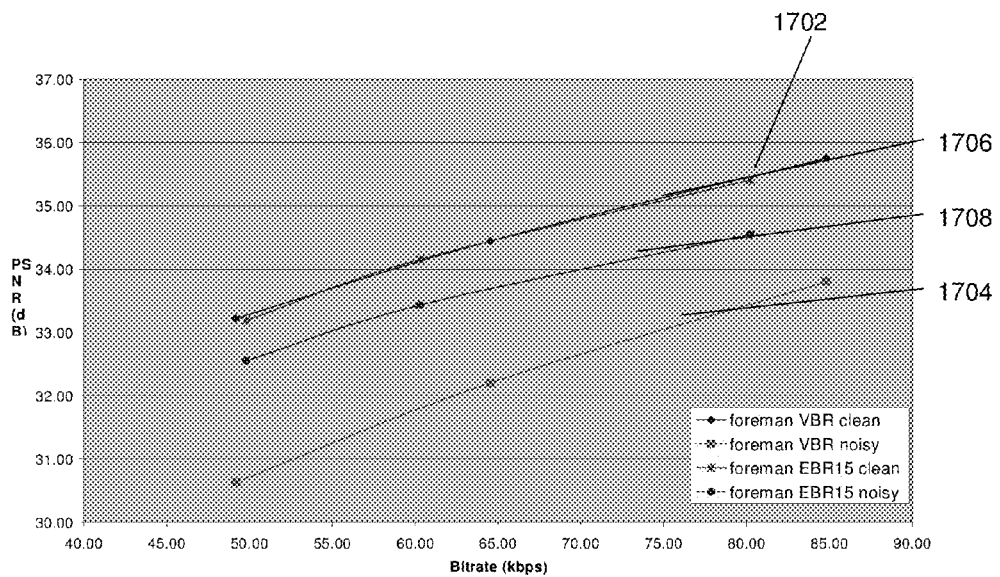
FIG. 17 is a graph illustrating the PSNR of a sample encoded video sequence versus bit rate for four different cases.

FIG. 17 is a graph illustrating the rate distortion of one of the standard encoded video sequences, entitled "Foreman." As shown in FIG. 17, four different cases are illustrated showing the PSNR versus bit rate. The first two cases show the video sequence encoded using VBR 1702 and 1704. The next two cases show the video sequence encoded using EBR15, where EBR15 is EBR using DCCH plus SCH configured as RS2 and 8× in RC5 respectively, as listed in case 15 in Table 2 above. The VBR and EBR data streams are transmitted over a "clean" channel 1702 and 1706 and a "noisy" channel 1704 and 1708. As noted above, in a clean channel there are no packets lost during transmission, and a noisy channel loses 1% of the data packets. As shown in FIG. 17 the VBR encoded sequence that is transmitted over a clean channel 1702, has the highest PSNR for all bit rates. But the EBR15 encoded sequence that is transmitted over a clean channel 1706 has nearly the same PSNR performance, or rate distortion, for all bit rates. Thus, there is a very small drop in performance between VBR and EBR 15 encoding when the transmission channel is clean. This example illustrates that when there are no packets lost during transmission there can be sufficient granularity in an EBR encoding configuration to have nearly equal performance to a true VBR encoding configuration.

When the VBR encoded sequence is transmitted over a noisy channel 1704 the PSNR drops significantly, over 3 dB, across all bit rates. But, when the EBR15 encoded sequence is transmitted over the same noisy channel 1708, although its PSNR performance degrades over all bit rates, its performance only drops about 1 dB. Thus, when transmitting over a noisy channel the PSNR performance of an EBR15 encoded sequence is about 2 dB higher that a VBR encoded sequence transmitted over the same noisy channel. As FIG. 17 shows, in a clean channel the rate distortion performance of EBR15 encoding is comparable to VBR encoding, and when the channel becomes noisy the rate distortion performance of the EBR15 encoding is superior to VBR encoding.

Figure 18:
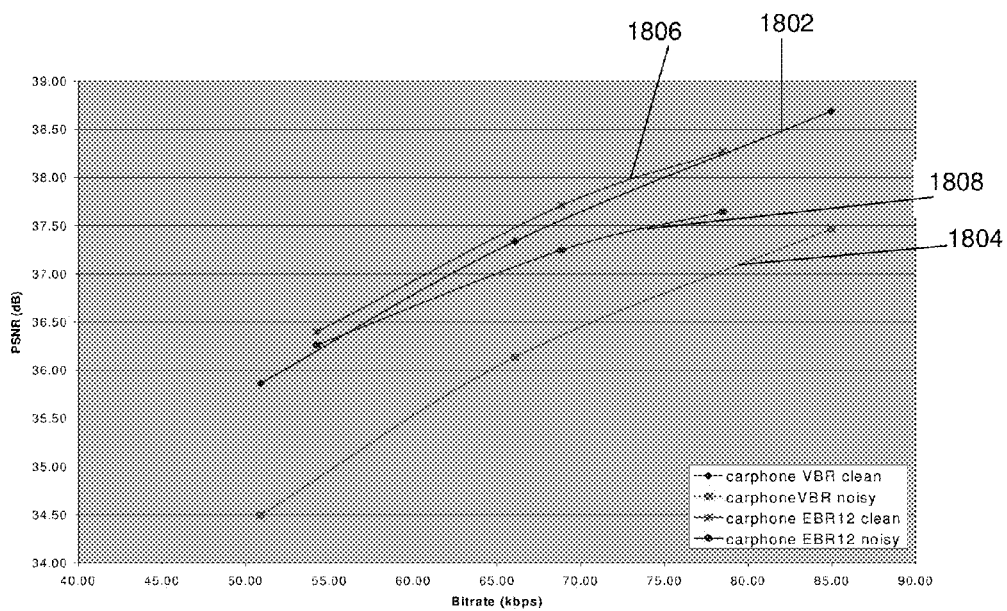
FIG. 18 is a graph illustrating the PSNR of another encoded video sequences versus bit rate for four different cases.

FIG. 18 is a graph, similar to FIG. 17, illustrating the rate distortion curves of another encoded video sequences, entitle "Carphone." Again, four different cases are illustrated showing the PSNR versus bit rate. The first two cases show the video sequence encoded using VBR 1802 and 1804. The next two cases show the video sequence encoded using EBR15, where EBR15 is EBR using DCCH plus VSCH configured as RS2 and 8× in RC5 respectively, as listed in case 15 in Table 2 above. The VBR and EBR data streams are transmitted over a "clean" channel 1802 and 1806, and a "noisy" channel 1804 and 1808. In this example, the PSNR performance of the EBR15 encoded sequence transmitted over a clean channel 1806 exceeds the performance of the VBR sequence over the clean channel 1802. The PSNR performance of the EBR15 sequence over the noisy channel 1808 exceed the VBR sequence transmitted over the noisy channel 1804 by about 1.5 dB. In this example, using the Carphone sequence in both a clean and noisy channel resulted in the rate distortion performance of EBR15 encoding having superior performance, as measured by PSNR, to the VBR encoding.

Latency Considerations

Use of EBR encoding improves latency performance. For example, using EBR video slices can be transmitted over a wireless channel without traffic shaping buffers at the encoder and the decoder. For real time services this is a significant benefit as the overall user experience can be enhanced.

To illustrate the buffering delay due to the variable bitrate (VBR) nature of video encoding, consider a transmission plan for a typical sequence encoded at an average bit rate of 64 kbps and transmitted over a 64 kbps CBR channel, shown in FIG. 6. In order to avoid buffer underflow at the decoder, the display, represented by curve 608, needs to be delayed. In this example, the delay is 10 frames or 1 second for a desired display rate of 10 fps.

The delay $\Delta_b$ due to buffer underflow constraints can be computed as follows:

$$B(i) = \sum_{j=0}^{i} R(i) - \sum_{j=0}^{i} C(i); B(i) \geq 0$$

$$C(i) = BW(i)/(f*8)$$

Eq. 10 where
B(i)=Buffer occupancy at the encoder in bytes at frame i
R(i)=Encoder output in bytes for frame i C(i)=No. of bytes that can be transmitted in frame interval i
f=Desired number of frames per second
BW(i)=Available bandwidth in bits at frame interval i
Note that for the special case of CBR transmission, C(i)=C ∀i.

In order to avoid decoder buffer starvation during the entire presentation, play out has to be delayed by the time required transmit maximum buffer occupancy at the encoder.

$$\Delta_b = \max\left\{\frac{B(i)}{1/I \sum_{i=1}^{I} C(i)}\right\}$$

Eq. 11

The denominator in the above represents the average data rate for the entire session duration I. For a CBR channel assignment, the denominator is C. For the EBR case, if the aggregate channel bandwidth for a given 100-ms duration is greater than the frame size i.e. C(i)≥R(i) ∀i∈I, there is no buffering delay. Then, it follows that the buffer occupancy at the encoder is 0, as data can be transmitted as it arrives. That is, $$B(i)=R(i)-C(i)=0.$$

Eq. 12

Note that video frames typically span multiple MAC layer frames K (slots). If it is possible to vary C(i) over the K slots so that all of R(i) can be transmitted, then the delay $\Delta_b$ due to buffering is 0, as B(i) is 0.

$$\Delta_b = \max\{B(i)/C(i)\} \forall i$$

Eq. 13

Figure 19:
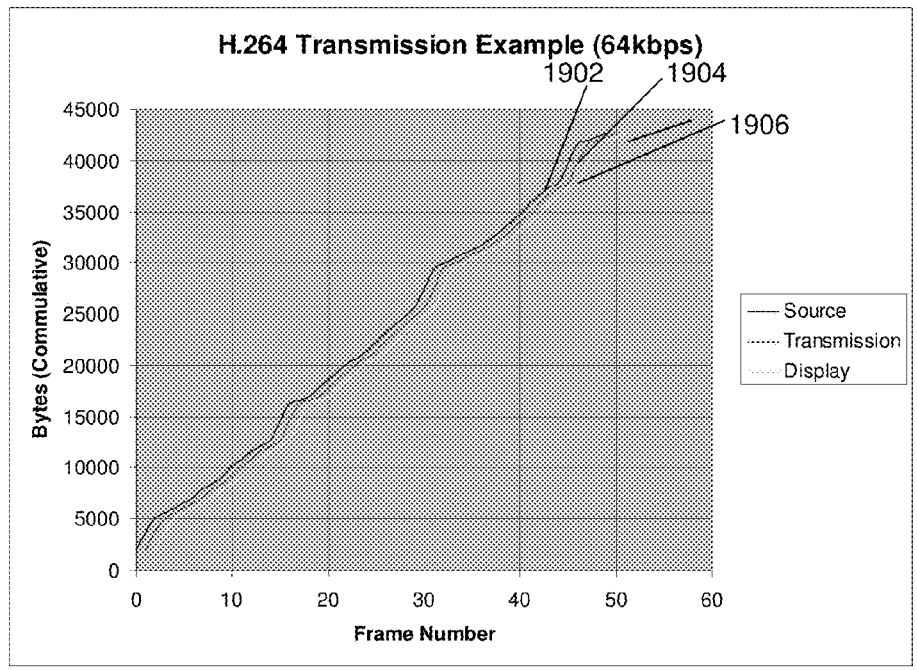
FIG. 19 is a graph illustrating the transmission plan for a AVC/H.264 stream of average rate 64 kbps.

FIG. 19 illustrates the transmission example for a typical EBR stream encoded at an average rate of 64 kbps. In FIG. 19 the cumulative bytes versus frame number is shown for the source 1902, the transmission 1904 and the display 1906 of a multimedia stream. In the example of FIG. 19, buffering delay is 0, but delays due to encoding, decoding and transmission are still present. However, these delays are typically much smaller when compared to the VBR buffering delay.

Figure 20:
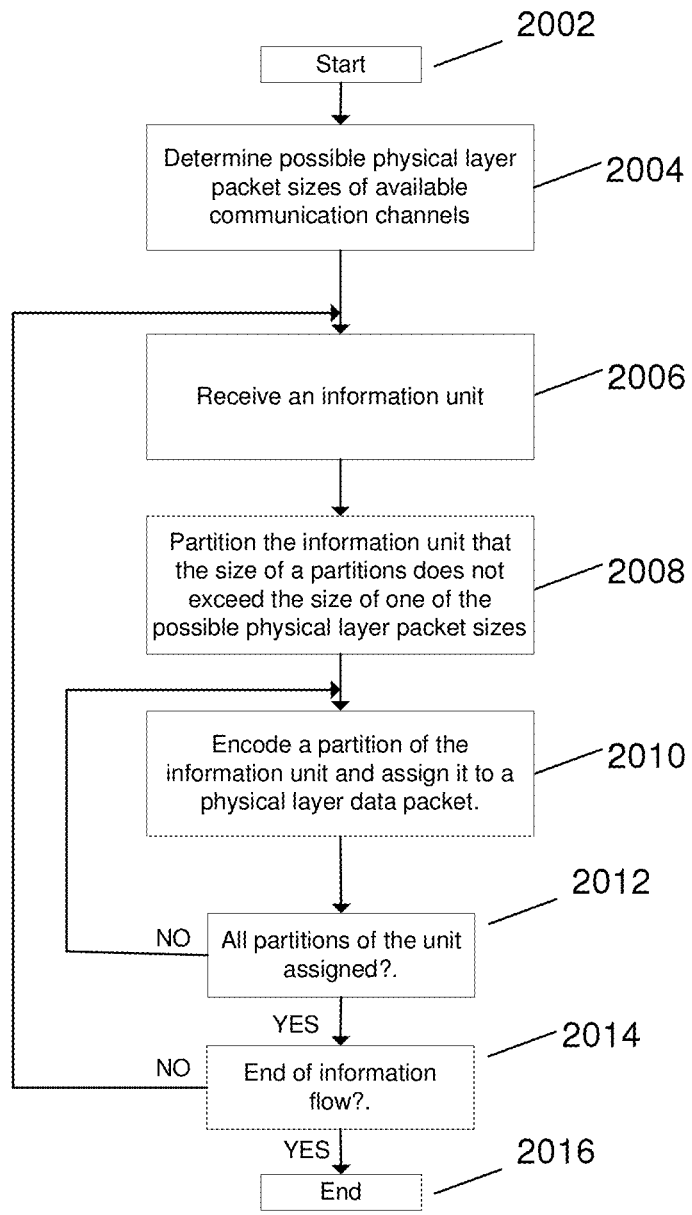
FIG. 20 is a flow diagram illustrating an embodiment of a method of transmitting data.

FIG. 20 is a flow diagram illustrating an embodiment of a method of transmitting data. Flow begins in block 2002. Flow then continues to block 2004. In block 2004 possible physical layer packet sizes of available communication channels are determined. For example, if the DCCH and SCH channels are used then the configuration of these radio channels will establish the physical layer packet sizes available, as illustrated in Table 2, above. Flow then continues to block 2006 where an information unit, for example a frame of a variable bit rate data stream is received. Examples of the variable bit rate data streams include a multimedia stream, such as a video stream. Flow then continues to block 2008.

In block 2008 the information units are partitioned into slices. The partitions, or slices, are selected such that their size does not exceed the size of one of the possible physical layer packet sizes. For example, the partitions can be sized such that each the size of the partition is no larger than at least one of the available physical layer packets' size. Flow then continues to block 2010 where the partition is encoded and assigned to a physical layer packet. For example, encoding information can include a source encoder equipped with a rate controlled module capable of generating partitions of varying size. Then, in block 2012 it is determined if all of the partitions of the frame have been encoded and assigned to a physical layer packet. If they have not, a negative outcome at block 2012, then flow continues to block 2010 and the next partition is encoded and assigned to a physical layer packet. Returning to block 2012, if all of the partitions of the frame have been encoded and assigned to a physical layer packet, an affirmative outcome at block 2012, then flow continues to block 2014.

In block 2014 it is determined if the flow of information has terminated, such as at the end of a session. If the flow of information has not terminated, a negative outcome at block 2014, flow continues to block 2006 and the next information unit is received. Returning to block 2014, if the flow of information has terminated such as the end of a session, an affirmative outcome at 2014, then flow continues to block 2016 and the process stops.

Figure 21:
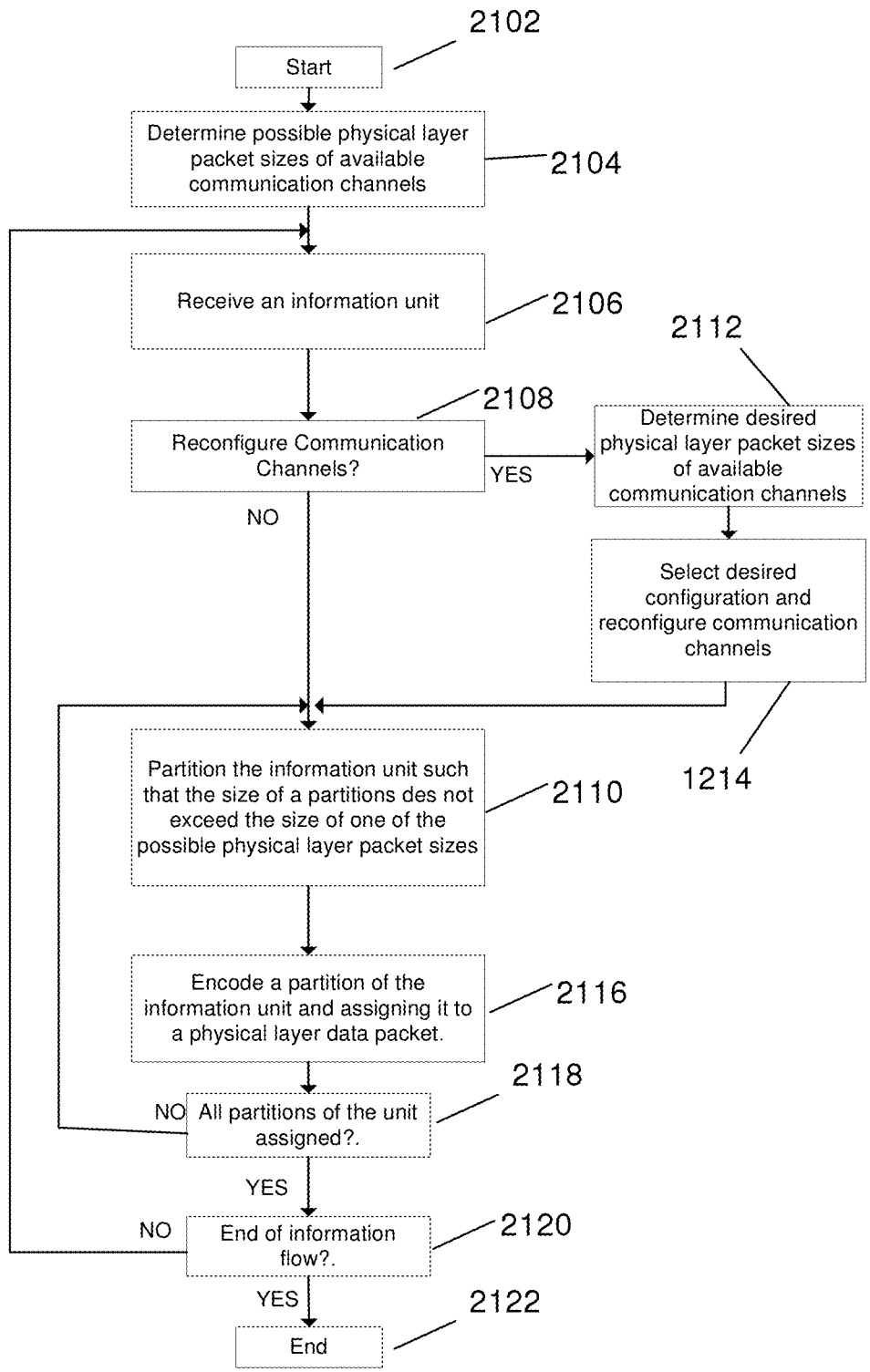
FIG. 21 is a flow diagram illustrating another embodiment of a method of transmitting data.

FIG. 21 is a flow diagram illustrating another embodiment of a method of transmitting data. Flow begins in block 2102. Flow then continues to block 2104. In block 2104 possible physical layer packet sizes of available communication channels are determined. For example, if the DCCH and SCH channels are used then the configuration of these radio channels will establish the physical layer packet sizes available, as illustrated in Table 2, above. Flow then continues to block 2106 where an information unit is received. For example, the information unit may be variable bit rate data such as a multimedia stream, or video stream. Flow then continues to block 2108.

In block 2108 it is determined if it is desirable to reconfigure the communication channels' configuration. If a communication channel is being used that can be reconfigured during a session, such as a V-SCH channel, it may be desirable to change the channel configuration during a session. For example, if frames of data that have more data than can be transmitted over the current configuration of communication channels it may be desired to change the configuration to a higher bandwidth so that the communication channel can support more data. In block 2108 if it is decided that it is not desired to reconfigure the communication channels, a negative outcome at block 2108, the flow continues to block 2110. In block 2110 the information unit is partitioned into sizes such that their size does not exceed the size of one of the possible physical layer packet sizes. Returning to block 2108, if it is determined that it is desired to reconfigure the communication channel, an affirmative outcome at block 2108, flow continues to block 2112. In block 2112 a desired physical layer packet size is determined. For example, the received information unit may be analyzed and the size of a data packet needed to transmit the entire unit may be determined. Flow then continues to block 2114. In block 2114 a desired communication channel configuration is determined. For example, the various physical layer packet sizes of different configurations of the available communication channels can be determined and a configuration that has physical layer packets that are large enough to accommodate the information unit may be selected. The communication channels are then reconfigured accordingly. Flow then continues to block 2110 where the information unit is partitioned into sizes such that their size matches the size of one of the possible physical layer packet sizes of the reconfigured communication channels. Flow then continues to block 2116. In block 2116 the partition is encoded and assigned to a physical layer data packet. For example, encoding information can include a source encoder equipped with a rate controlled module capable of generating partitions of varying size. Flow then continues to block 2118.

In block 2118 it is determined if all of the partitions of the information unit have been encoded and assigned to a physical layer packet. If they have not, a negative outcome at block 2118, then flow continues to block 2110 and the next partition is encoded and assigned to a physical layer packet. Returning to block 2118, if all of the partitions of the information unit have been encoded and assigned to a physical layer packet, an affirmative outcome at block 2118, then flow continues to block 2120.

In block 2120 it is determined if the information flow has terminated, such as at the end of a session. If the information flow has not terminated, a negative outcome at block 2120, then flow continues to block 2106 and the next information unit is received. Returning to block 2120, if the information flow is terminated, an affirmative outcome at block 2120, then flow continues to block 2122 and the process stops.

Figure 22:
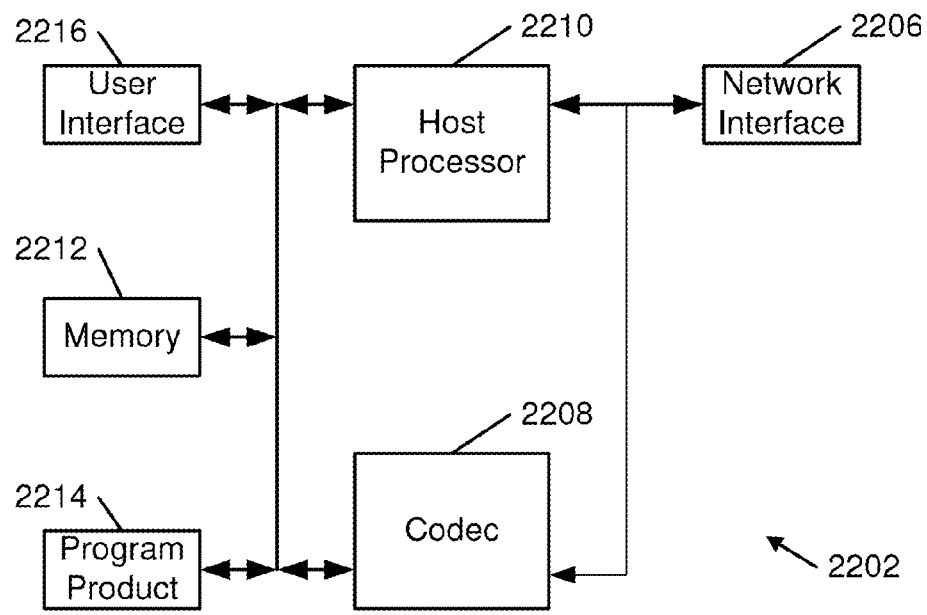
FIG. 22 is a block diagram of a wireless communication device, or a mobile station (MS), constructed in accordance with an exemplary embodiment of the present invention.

FIG. 22 is a block diagram of a wireless communication device, or a mobile station (MS), constructed in accordance with an exemplary embodiment of the present invention. The communication device 2202 includes a network interface 2206, codec 2208, a host processor 2210, a memory device 2212, a program product 2214, and a user interface 2216.

Signals from the infrastructure are received by the network interface 2206 and sent to the host processor 2210. The host processor 2210 receives the signals and, depending on the content of the signal, responds with appropriate actions. For example, the host processor 2210 may decode the received signal itself, or it may route the received signal to the codec 2208 for decoding. In another embodiment, the received signal is sent directly to the codec 2208 from the network interface 2206.

In one embodiment, the network interface 2206 may be a transceiver and an antenna to interface to the infrastructure over a wireless channel. In another embodiment, the network interface 2206 may be a network interface card used to interface to the infrastructure over landlines. The codec 2208 may be implemented as a digital signal processor (DSP), or a general processor such as a central processing unit (CPU).

Both the host processor 2210 and the codec 2208 are connected to a memory device 2212. The memory device 2212 may be used to store data during operation of the WCD, as well as store program code that will be executed by the host processor 2210 or the DSP 2208. For example, the host processor, codec, or both, may operate under the control of programming instructions that are temporarily stored in the memory device 2212. The host processor 2210 and codec 2208 also can include program storage memory of their own. When the programming instructions are executed, the host processor 2210 or codec 2208, or both, perform their functions, for example decoding or encoding multimedia streams. Thus, the programming steps implement the functionality of the respective host processor 2210 and codec 2208, so that the host processor and codec can each be made to perform the functions of decoding or encoding content streams as desired. The programming steps may be received from a program product 2214. The program product 2214 may store, and transfer the programming steps into the memory 2212 for execution by the host processor, codec, or both.

The program product 2214 may be semiconductor memory chips, such as RAM memory, flash memory, ROM memory, EPROM memory, EEPROM memory, registers, as well as other storage devices such as a hard disk, a removable disk, a CD-ROM, or any other form of storage medium known in the art that may store computer readable instructions. Additionally, the program product 2214 may be the source file including the program steps that is received from the network and stored into memory and is then executed. In this way, the processing steps necessary for operation in accordance with the invention may be embodied on the program product 2214. In FIG. 22, the exemplary storage medium is shown coupled to the host processor 2210 such that the host processor may read information from, and write information to, the storage medium. Alternatively, the storage medium may be integral to the host processor 2210.

The user interface 2216 is connected to both the host processor 2210 and the codec 2208. For example, the user interface 2216 may include a display and a speaker used to output multimedia data to the user.

Those of skill in the art will recognize that the step of a method described in connection with an embodiment may be interchanged without departing from the scope of the invention.

Those of skill in the art would also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of transmitting information in a wireless communication system, the method comprising:
    determining available physical layer packet sizes of a plurality of available constant bit rate communication channels;
    establishing constraints that are configured to restrict sizes of partitions of information units at an application-layer so as not to exceed the physical layer packet size of at least one of the available physical layer packet sizes provided by the plurality of available constant bit rate communication channels; and
    encoding information units into application-layer data packets in accordance with the established constraints.

2. The method of claim 1, wherein wherein the encoding is performed by a source encoder equipped with a rate controlled module capable of generating partitions of varying size.

3. The method of claim 1, wherein the application-layer information units comprise a variable bit rate data stream.

4. The method of claim 1, wherein the application-layer information units comprise multimedia data.

5. The method of claim 1, wherein the application-layer information units comprise video data.

6. The method of claim 1, wherein the application-layer information units comprise audio data.

7. The method of claim 1, wherein the constant bit rate communication channels are CDMA channels.

8. The method of claim 7, wherein the constant bit rate communication channels include a supplemental channel.

9. The method of claim 7, wherein the constant bit rate communication channels include a dedicated control channel.

10. The method of claim 7, wherein the constant bit rate communication channels include a packet data channel.

11. The method of claim 1, wherein the constant bit rate communication channels are GSM channels.

12. The method of claim 1, wherein the constant bit rate communication channels are EDGE channels.

13. The method of claim 1, wherein the constant bit rate communication channels are GPRS channels.

14. The method of claim 1, wherein the constraints are used during encoding of the application-layer information units.

15. The method of claim 1, wherein the application-layer information units occur at a constant interval.

16. A method of transmitting information in a wireless communication system, the method comprising:
    determining available physical layer packet sizes for a plurality of available constant bit rate communication channels; and
    encoding an information unit into application-layer data packets, wherein individual data packet sizes of the application-layer data packets are selected so as not to exceed one of the available physical layer packet sizes of the available constant bit rate communication channels.

17. The method of claim 16, wherein encoding information comprises a source encoder equipped with a rate controlled module capable of generating partitions of varying size.

18. The method of claim 16, wherein the information unit comprises a multimedia stream.

19. The method of claim 16, wherein the information unit comprises video data.

20. The method of claim 16, wherein the information unit comprises audio data.

21. The method of claim 16, wherein the constant bit rate communication channels are CDMA channels.

22. The method of claim 21, wherein the constant bit rate communication channels include a supplemental channel.

23. The method of claim 21, wherein the constant bit rate communication channels include a dedicated control channel.

24. The method of claim 21, wherein the constant bit rate communication channels include a packet data channel.

25. The method of claim 16, wherein the constant bit rate communication channels are GSM channels.

26. The method of claim 16, wherein the constant bit rate communication channels are EDGE channels.

27. The method of claim 16, wherein the constant bit rate communication channels are GPRS channels.

28. The method of claim 16, wherein the information unit is one of a plurality of information units that occur at a constant interval.

29. A wireless communication device comprising:
a controller configured to determine a set of physical layer packet sizes from a plurality of available constant bit rate communication channels; and
an encoder configured to partition information units into application-layer data packets, wherein an individual data packet size of the application-layer data packets is selected not to exceed at least one of the physical layer packet sizes of the available constant bit rate communication channels.

30. The wireless communication device of claim 29, wherein the encoder further comprises a rate controlled module capable of generating partitions of varying size.

31. The wireless communication device of claim 29, further comprising a transmitter configured to transmit the physical layer packets.

32. The wireless communication device of claim 29, wherein the information units comprise a variable bit rate data stream.

33. The wireless communication device of claim 29, wherein the information units comprise multimedia data.

34. The wireless communication device of claim 29, wherein the information units comprise video data.

35. The wireless communication device of claim 29, wherein the plurality of constant bit rate channels are CDMA channels.

36. The wireless communication device of claim 29, wherein the plurality of constant bit rate channels are GSM channels.

37. The wireless communication device of claim 29, wherein the plurality of constant bit rate channels are GPRS channels.

38. The wireless communication device of claim 29, wherein the plurality of constant bit rate channels are EDGE channels.

39. An apparatus, comprising:
a memory; and
at least one processor coupled to the memory and configured to accept information units and partition the information units into application-layer data packets, wherein the application-layer data packets are sized so as not to exceed at least one physical layer packet size of an available constant bit rate communication channel.

40. The apparatus of claim 39, wherein the information units occur at a constant rate.

41. The apparatus of claim 39, wherein the information units comprise a variable bit rate data stream.

42. The apparatus of claim 39, wherein the information units comprise multimedia data.

43. The apparatus of claim 39, wherein the information units comprise video data.

44. The apparatus of claim 39, wherein the information units comprise audio data.

45. The apparatus of claim 39, wherein the constant bit rate communication channel is a CDMA channel.

46. The apparatus of claim 39, wherein the constant bit rate communication channel is a GSM channel.

47. The apparatus of claim 39, wherein the constant bit rate communication channel is a GPRS channel.

48. The apparatus of claim 39, wherein the constant bit rate communication channel is an EDGE channel.

49. The apparatus of claim 46, wherein the apparatus limits the aggregate of each of the application-layer data packets to a pre-selected maximum number of bits.

50. A non-transitory computer readable media containing program instructions stored thereon, which, when executed by at least one processor, cause the at least one processor to perform a method of encoding data, the method comprising partitioning information units into a plurality of application-layer data packets wherein each application-layer data packet is sized not to exceed at least one physical layer packet size from a set of physical layer packet sizes corresponding to available constant bit rate communication channels.

* * * * *